(12) United States Patent
Fraser et al.

(10) Patent No.: US 12,441,621 B2
(45) Date of Patent: Oct. 14, 2025

(54) TREATMENT PROCESS FOR CRYSTALLIZING A METAL SULFATE

(71) Applicant: HATCH LTD., Mississauga (CA)

(72) Inventors: Robert John Fraser, Oakville (CA); Henry Christian Immo Von Schroeter, Toronto (CA); Mark Joseph Machado, Waterdown (CA)

(73) Assignee: HATCH LTD.

( * ) Notice: Subject to any disclaimer, the term of this patent is extended or adjusted under 35 U.S.C. 154(b) by 0 days.

(21) Appl. No.: 17/977,408

(22) Filed: Oct. 31, 2022

(65) Prior Publication Data

US 2023/0049318 A1    Feb. 16, 2023

Related U.S. Application Data

(63) Continuation of application No. PCT/CA2021/051557, filed on Nov. 3, 2021.

(60) Provisional application No. 63/109,227, filed on Nov. 3, 2020.

(51) Int. Cl.
    *C01G 1/10*    (2006.01)
(52) U.S. Cl.
    CPC ............ *C01G 1/10* (2013.01); *C01P 2006/40* (2013.01); *C01P 2006/80* (2013.01)
(58) Field of Classification Search
    None
    See application file for complete search history.

(56) References Cited

U.S. PATENT DOCUMENTS

| | | |
|---|---|---|
| 3,656,937 A | 4/1972 | Gandon et al. |
| 4,698,139 A | 10/1987 | Fugleberg et al. |
| 10,995,014 B1 | 5/2021 | Fraser et al. |
| 2017/0077564 A1 | 3/2017 | Wang et al. |
| 2017/0298472 A1* | 10/2017 | Komon ................ C22B 3/28 |

(Continued)

FOREIGN PATENT DOCUMENTS

| | | |
|---|---|---|
| CA | 3076688 A1 | 4/2019 |
| CN | 102286661 A | 12/2011 |
| CN | 102534223 A | 7/2012 |

(Continued)

OTHER PUBLICATIONS

Chen et al. CN103011296; translation provided by Google Jul. 2023.*

(Continued)

*Primary Examiner* — Guinever S Gregorio
(74) *Attorney, Agent, or Firm* — Borden Ladner Gervais LLP; Brandon Evenson

(57) ABSTRACT

A treatment process for crystallizing a metal sulfate involving pre-treating a feedstock comprising calcium, magnesium, and/or lithium impurities, the pre-treating involving pre-leaching the feedstock in the presence of a lixiviant, selectively extracting a first portion of any of the impurities from the feedstock, and forming a leached solution comprising an uncrystallized metal sulfate and any remaining impurities; and/or refining the leached solution and removing a second portion of any of the remaining impurities; and crystallizing the uncrystallized metal sulfate from the leached solution to form a crystallized metal sulfate. So processed, the crystallized metal sulfate may be battery-grade or electroplating-grade.

41 Claims, 9 Drawing Sheets

(56) References Cited

U.S. PATENT DOCUMENTS

| | | | |
|---|---|---|---|
| 2018/0155208 A1 | 6/2018 | Chow et al. | |
| 2019/0152797 A1* | 5/2019 | Liu ................... | B01D 9/0031 |

FOREIGN PATENT DOCUMENTS

| | | | |
|---|---|---|---|
| CN | 103011296 A | 4/2013 | |
| CN | 105712383 A | 6/2016 | |
| CN | 109055757 A | 8/2017 | |
| CN | 109279667 A | 1/2019 | |
| CN | 109734107 A | 5/2019 | |
| CN | 108002408 B | 6/2021 | |
| CN | 113106257 A | 7/2021 | |
| EP | 3670686 A1 | 6/2020 | |
| JP | 2017149609 A | 8/2017 | |
| WO | 2017139852 A1 | 8/2017 | |
| WO | 2020061639 A1 | 4/2020 | |

OTHER PUBLICATIONS

International Preliminary Report on Patentability for International Application No. PCT/CA2021/051557, dated May 8, 2023.
International Search Report and Written Opinion for International Application No. PCT/CA2021/051557, dated Feb. 10, 2022.
Russian office action dated Aug. 18, 2023 for Appln. No. 202391125/28 and English translation.
Cuban office action dated Aug. 4, 2023 for Appln. No. 2023-0021.
Cuban office action dated May 8, 2023 for Appln. No. 2023-0021.
Gallerani., "Bleed & Feed for Process Solution Control," Plating and Surface Finishing, 2009, pp. 26-28.
Junmin et al., "Recovery of Metal Values from a Mixture of Spent Lithium-ion Batteries and Nickel-metal Hydride Batteries", Hydrometallurgy, 2006, vol. 84(1-2) pp. 75-80.
Shi, et al., "Removal of Calcium and Magnesium From Lithium Concentrated Solution by Solvent Extraction Method Using D2EHPA," Desalination, 2020, vol. 479, pp. 1-12.
Tsuen-Ni et al., "Chemical Reclaiming of Nickel Sulfate from Nickel-Bearing Wastes," Conservation & Recycling, 1983, vol. 6(1-2), pp. 55-62.
Yang et al., "Stepwise Recycling of Valuable Metals From Ni-rich Cathode Material of Spent Lithium-ion Batteries", Waste Management, Elsevier, New York, 2019, vol. 102, pp. 131-138.

* cited by examiner

TREATMENT PROCESS FOR CRYSTALLIZING A METAL SULFATE

This application claims priority to each of U.S. Provisional Application No. 63/109,227, filed Nov. 3, 2020, and PCT application PCT/CA2021/051557 filed Nov. 3, 2021; the contents of each of which is incorporated herein by reference in its entirety.

FIELD

The present disclosure relates generally to treatment processes. More particularly, the present disclosure relates to treatment processes for crystallizing metal sulfates.

BACKGROUND

Continued technological advancements, such as the electrification of transportation, has increased demand for batteries, such as lithium ion batteries. With this growing demand for batteries, there has come a growing demand for the materials from which batteries are made, such as crystallized metal sulfates.

However, the presence of calcium, magnesium, and/or lithium in feedstocks used to produce the materials for batteries can result in processing difficulties. Such processing difficulties can include contamination of the final products, higher energy consumptions, and/or larger process bleed streams. In sulfate-media based processes, calcium can cause additional problems due to the low solubility of calcium sulfate salts. Said low solubilities can result in process streams that are supersaturated with calcium sulphate, resulting in unwanted solids formation within the process equipment.

An improved treatment process for managing impurities in the production of materials for batteries, such as crystallized metal sulfates, is desired.

BRIEF DESCRIPTION OF THE FIGURES

Embodiments of the present disclosure will now be described, by way of example only, with reference to the attached Figures.

DETAILED DESCRIPTION

Figure 1:
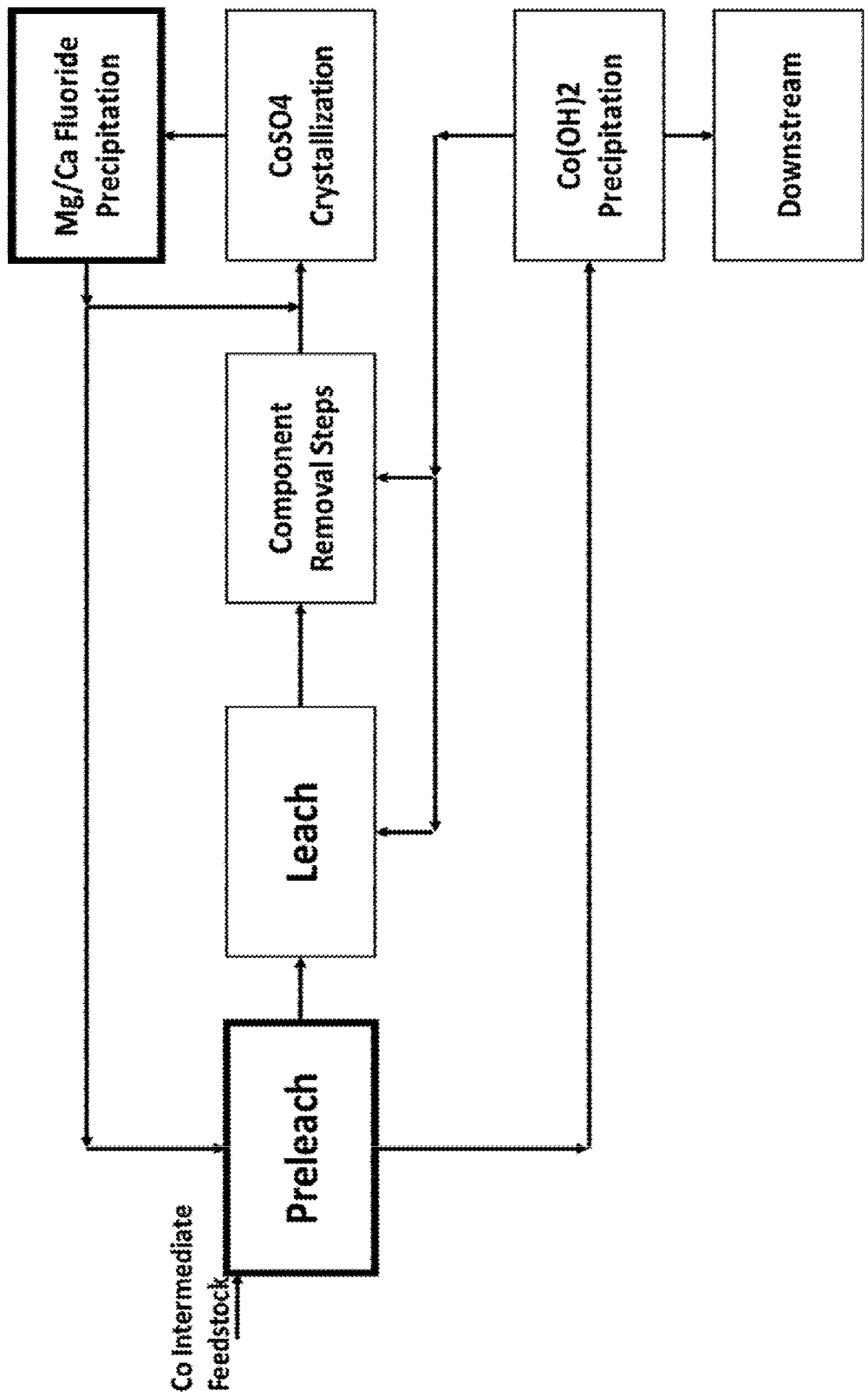
FIG. 1 depicts a treatment process for crystallizing a metal sulfate involving a Co intermediate feedstock that comprises calcium and/or magnesium impurities.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein refers to the list that follows as being non-exhaustive and may or may not include any other additional suitable items, for example one or more further feature(s), component(s) and/or ingredient(s) as appropriate.

As used herein, "NMC" refers to nickel, manganese, and/or cobalt. As used herein, "metal sulfates" refers to any one or combination of nickel sulfate, cobalt sulfate, and/or manganese sulfate. Further, "metal hydroxides" refers to any one or combination of nickel hydroxide, cobalt hydroxide, and/or manganese hydroxide.

As used herein, "crystallization", "crystallizing", or "crystallized" refers to the process of forming a crystal network that selectively and slowly formed from metal sulfates in a leached solution (or PLS), resulting in a pure crystalline compound (at least as indicated by x-ray diffraction). In contrast, as used herein, "precipitation" refers to a process characterized by the addition of a precipitation or basification reagent and the formation of a crystalline or amorphous solid from solution. As used herein, "co-crystallize" or "co-crystallizing" refers to crystallizing two or more components (e.g., metal sulfates, impurities, etc.) out of solution together (e.g., at the same time). Used herein, when referencing "selectively crystallizing" or "selectively co-crystallizing" metal sulfates, "selective" refers to crystallizing the metal sulfate away from most, if not all impurities or other components; in other words, "selective" refers to forming a pure, crystallized metal sulfate.

As used herein, "feedstock" or "pre-leached feedstock" refers to solid matter that comprises at least some materials that are desirable to extract/isolate from said solid(s) for further processing and/or use in end products, such as metals desirable in the production of materials for batteries.

As used herein, a 'treatment process' refers a process that may comprise a pre-treatment step (e.g., pre-leaching), a refining step that treats a leached solution to remove impurities (e.g., fluoride precipitation, direct lithium extraction), or a combination of both.

As used herein, an 'impurity' refers to a component of a feedstock that is not a metal sulfate as described herein, or does not contribute to formation of a metal sulfate or crystallized metal sulfate as described herein. As used herein, an 'impurity', once isolated from a feedstock, may be a useful, valuable, or desirable material.

Treatment Processes for Feedstocks Comprising Impurities

Generally, the present disclosure provides a treatment process for crystallizing a metal sulfate, the process comprising: pre-treating a feedstock comprising calcium, magnesium, and/or lithium impurities, the pre-treating comprising pre-leaching the feedstock in the presence of a lixiviant, selectively extracting a first portion of the impurities from the feedstock, and forming a pre-leached feedstock; refining the pre-leached feedstock and forming a leached solution comprising an uncrystallized metal sulfate, the refining optionally comprising removing a second portion of the impurities from the leached solution when the leached solution comprising an uncrystallized metal sulfate further comprises the impurities; and crystallizing the uncrystallized metal sulfate from the leached solution to form a crystallized metal sulfate.

The present disclosure also generally provides a treatment process for crystallizing a metal sulfate, the process comprising: pre-treating a feedstock comprising calcium, magnesium, and/or lithium impurities, the pre-treating comprising pre-leaching the feedstock in the presence of a lixiviant, selectively extracting a first portion of the impurities from the feedstock, and forming a pre-leached feedstock; refining the pre-leached feedstock and forming a leached solution comprising an uncrystallized metal sulfate, the refining optionally comprising removing a second portion of the impurities from the leached solution when the leached solution comprising an uncrystallized metal sulfate further comprises the impurities; crystallizing the uncrystallized metal sulfate from the leached solution to form a crystallized metal sulfate in a mother liquor, the mother liquor comprising a remaining uncrystallized metal sulfate; separating the crystallized metal sulfate from the mother liquor; basifying a portion of the mother liquor to convert the remaining uncrystallized metal sulfate to a basic metal salt; and using the basic metal salt upstream of crystallizing the metal sulfate.

Further, the present disclosure generally provides a treatment process for crystallizing a metal sulfate, the process comprising: leaching a feedstock comprising calcium, magnesium, and/or lithium impurities and forming a leached solution comprising an uncrystallized metal sulfate and the calcium, magnesium, and/or lithium impurities; refining the leached solution, the refining comprising removing a portion of the impurities; and crystallizing the uncrystallized metal sulfate from the leached solution to form a crystallized metal sulfate.

The present disclosure further generally provides a treatment process for crystallizing a metal sulfate, the process comprising: leaching a feedstock comprising calcium, magnesium, and/or lithium impurities and forming a leached solution comprising an uncrystallized metal sulfate and the calcium, magnesium, and/or lithium impurities; refining the leached solution, the refining comprising removing a portion of the impurities; crystallizing the uncrystallized metal sulfate from the leached solution to form a crystallized metal sulfate in a mother liquor, the mother liquor comprising a remaining uncrystallized metal sulfate; separating the crystallized metal sulfate from the mother liquor; basifying a portion of the mother liquor to convert the remaining uncrystallized metal sulfate to a basic metal salt; and using the basic metal salt upstream of crystallizing the metal sulfate.

In one or more embodiments of the present disclosure, crystallizing the uncrystallized metal sulfate from the leached solution to form a crystallized metal sulfate comprises crystallizing the uncrystallized metal sulfate from the leached solution to form a crystallized metal sulfate in a mother liquor, the mother liquor comprising remaining uncrystallized metal sulfate; separating the crystallized metal sulfate from the mother liquor; basifying a portion of the mother liquor to convert the remaining uncrystallized metal sulfate to a basic metal salt; and using the basic metal salt upstream of crystallizing the metal sulfate.

In one or more embodiments of the present disclosure, using the basic metal salt upstream comprises converting the basic metal salt back to the remaining uncrystallized metal sulfate. In one or more embodiments, converting the basic metal salt back to the remaining uncrystallized metal sulfate comprises using the basic metal salt as a neutralizing agent to neutralize acid upstream of crystallizing the metal sulfate. In one or more embodiments, basifying a portion of the mother liquor to convert the remaining uncrystallized metal sulfate to the basic metal salt further comprises bleeding the mother liquor and controlling the bleed rate to produce an amount of the basic metal salt that is at least approximately equivalent to an amount of the acid to be neutralized upstream of crystallizing the metal sulfate.

In one or more embodiments, one or more of the treatment processes of the present disclosure further comprises crystallizing the remaining uncrystallized metal sulfate.

In one or more embodiments of the present disclosure, crystallizing the metal sulfate further comprises bleeding the mother liquor and controlling the bleed rate from a crystallizer to selectively inhibit crystallizing an impurity when crystallizing the metal sulfate. In one or more embodiments, crystallizing the metal sulfate further comprises controlling an amount of free water in a crystallizer, by one or more of controlling the rate of water evaporation from the crystallizer, and controlling the addition of water to the crystallizer, to selectively inhibit crystallizing an impurity when crystallizing the metal sulfate.

In one or more embodiments of the present disclosure, the impurity comprises sodium, or potassium, etc. In one or more embodiments of the present disclosure, the metal sulfate comprises nickel sulfate, cobalt sulfate, or manganese sulfate. In one or more embodiments of the present disclosure, the basic metal salt comprises a metal hydroxide. In one or more embodiments, the metal hydroxide comprises nickel hydroxide, cobalt hydroxide, or manganese hydroxide.

Figure 8:
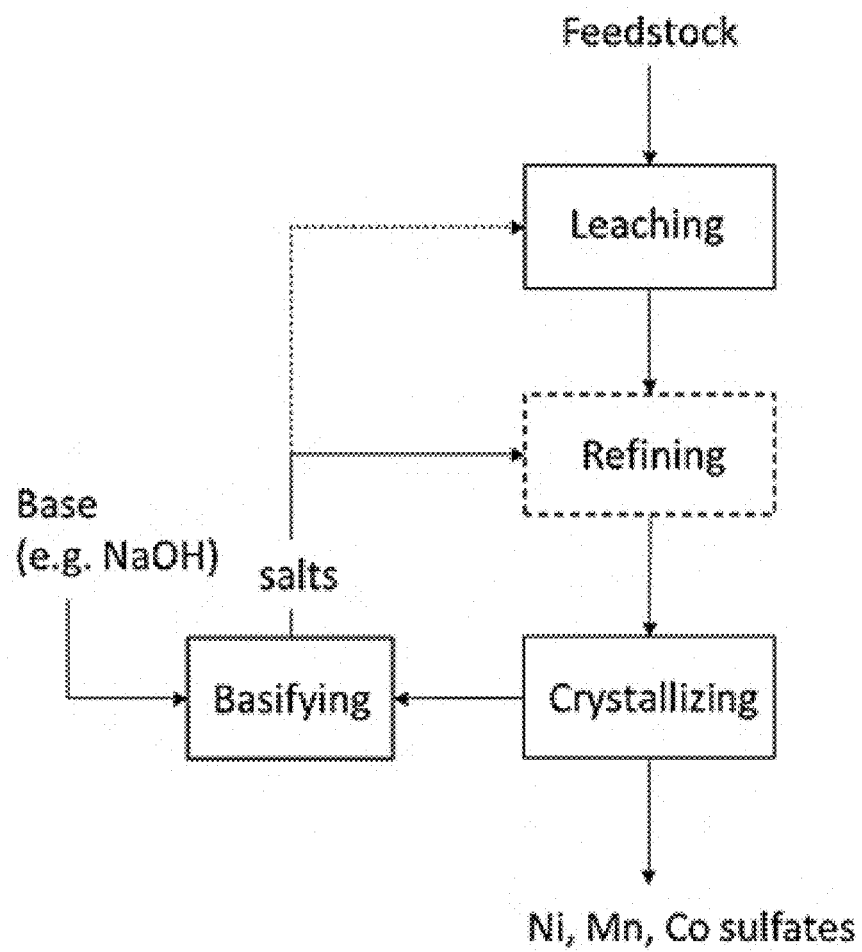
FIG. 8 depicts a flow diagram of a general process for generating crystallized metal sulfates.

In one or more embodiments of one or more of the treatment processes of the present disclosure, there is provided a treatment process as depicted in FIG. 8, wherein: the leaching and refining steps comprise pre-treating a feedstock as described herein to form a pre-leached feedstock, and subjecting the pre-leached feedstock to leaching and refining steps to form a refined, leached solution comprising an uncrystallized metal sulfate; the crystallizing step comprises introducing the refined, leached solution into a crystallizer and forming a crystallized metal sulfate (e.g., nickel, manganese, and/or cobalt sulfates) in a mother liquor, the mother liquor comprising remaining uncrystallized metal sulfate, and separating the crystallized metal sulfate from the mother liquor; and the basifying step comprises basifying a portion of the mother liquor to convert the remaining uncrystallized metal sulfate to a basic metal salt; and using the basic metal salt upstream of crystallizing the metal sulfate; for example, as a neutralizing agent to neutralize acid upstream of crystallizing the metal sulfate.

Treatment Processes for Feedstocks Comprising Calcium and/or Magnesium Impurities In one or more embodiments of the present disclosure, there is provided a treatment process for crystallizing a metal sulfate, the process comprising:
  pre-treating a feedstock comprising calcium and/or magnesium impurities, the pre-treating comprising pre-leaching the feedstock in the presence of a lixiviant, selectively extracting a first portion of the calcium and/or magnesium impurities from the feedstock, and forming a pre-leached feedstock;
  refining the pre-leached feedstock and forming a leached solution comprising an uncrystallized metal sulfate;
  crystallizing the uncrystallized metal sulfate from the leached solution to form a crystallized metal sulfate in a mother liquor, the mother liquor comprising a remaining uncrystallized metal sulfate;
  separating the crystallized metal sulfate from the mother liquor;
  basifying a portion of the mother liquor to convert the remaining uncrystallized metal sulfate to a basic metal salt; and
  using the basic metal salt upstream of crystallizing the metal sulfate.

In one or more embodiments of the present disclosure, there is provided a treatment process for crystallizing a metal sulfate, the process comprising:
  pre-treating a feedstock comprising calcium and/or magnesium impurities, the pre-treating comprising
  pre-leaching the feedstock in the presence of a lixiviant, selectively extracting a first portion of the calcium and/or magnesium impurities from the feedstock, and forming a pre-leached feedstock;
  refining the pre-leached feedstock and forming a leached solution comprising an uncrystallized metal sulfate; and
  crystallizing the uncrystallized metal sulfate from the leached solution to form a crystallized metal sulfate.

In one or more embodiments of the present disclosure, there is provided a treatment process wherein the leached solution comprising an uncrystallized metal sulfate further comprises a second portion of the calcium and/or magnesium impurities from the feedstock, and the refining comprises adding a fluoride source to the leached solution, selectively reacting the fluoride source with the second portion of the calcium and/or magnesium impurities and forming calcium and/or magnesium fluoride compounds, and precipitating the calcium and/or magnesium fluoride compounds from the leached solution.

In one or more embodiments of the present disclosure, there is provided a treatment process wherein the leached solution comprising an uncrystallized metal sulfate further comprises a second portion of the calcium and/or magnesium impurities from the feedstock, and the refining comprises a solvent extraction step that selectively extracts at least the second portion of the calcium and/or magnesium impurities from the leached solution onto, or into a solvent extraction reagent. In one or more embodiments, the solvent extraction step further comprises scrubbing the calcium and/or magnesium impurities from the solvent extraction reagent.

In one or more embodiments of the present disclosure, there is provided a treatment process for crystallizing a metal sulfate, the process comprising:
  leaching a feedstock comprising calcium and/or magnesium impurities and forming a leached solution comprising an uncrystallized metal sulfate and the calcium and/or magnesium impurities;
  refining the leached solution, the refining comprising adding a fluoride source to the leached solution,
    selectively reacting the fluoride source with a portion of the calcium and/or magnesium impurities and forming calcium and/or magnesium fluoride compounds, and
    precipitating the calcium and/or magnesium fluoride compounds from the leached solution;
  crystallizing the uncrystallized metal sulfate from the leached solution to form a crystallized metal sulfate in a mother liquor, the mother liquor comprising a remaining uncrystallized metal sulfate;
  separating the crystallized metal sulfate from the mother liquor;
  basifying a portion of the mother liquor to convert the remaining uncrystallized metal sulfate to a basic metal salt; and
  using the basic metal salt upstream of crystallizing the metal sulfate.

In one or more embodiments of the present disclosure, there is provided a treatment process for crystallizing a metal sulfate, the process comprising:
  leaching a feedstock comprising calcium and/or magnesium impurities and forming a leached solution comprising an uncrystallized metal sulfate and the calcium and/or magnesium impurities;
  refining the leached solution, the refining comprising adding a fluoride source to the leached solution,
    selectively reacting the fluoride source with a portion of the calcium and/or magnesium impurities and forming calcium and/or magnesium fluoride compounds, and
    precipitating the calcium and/or magnesium fluoride compounds from the leached solution; and
  crystallizing the uncrystallized metal sulfate from the leached solution to form a crystallized metal sulfate.

In one or more embodiments of one or more of the treatment processes for calcium and/or magnesium impurities, the feedstock comprises intermediate feedstocks. Intermediate feedstocks are feedstocks that have been pre-processed from original, or raw feedstocks. In one or more embodiments, intermediate feedstocks may comprise lower concentrations of impurities following the pre-processing than the original, raw feedstocks. In one or more embodiments, intermediate feedstocks are comprised of concentrates. In one or more embodiments, the intermediate feedstocks include metal-comprising intermediate feeds. In one or more embodiments, metal-comprising intermediate feeds are comprised of metal hydroxides and/or mixed hydroxide precipitates (MHP). In one or more embodiments, the metal-comprising intermediate feeds comprise, in addition to impurities such as calcium and/or magnesium, metals desirable in the production of materials for batteries, such as cobalt, manganese, and/or nickel. In one or more embodiments, the intermediate feedstocks comprise nickel, manganese, and/or cobalt intermediate feeds. In one or more embodiments, cobalt intermediate feeds are comprised of $Co(OH)_2$ and/or mixed hydroxide precipitates (MHP). In one or more embodiments, the cobalt intermediate feeds comprise, in addition to impurities such as calcium and/or magnesium, metals desirable in the production of materials for batteries, such as cobalt, manganese, and/or nickel. In one or more embodiments, manganese intermediate feeds are comprised of $Mn(OH)_2$ and/or mixed hydroxide precipitates (MHP). In one or more embodiments, the manganese intermediate feeds comprise, in addition to impurities such as calcium and/or magnesium, metals desirable in the production of materials for batteries, such as manganese, cobalt, and/or nickel. In one or more embodiments, the nickel intermediate feeds comprise $Ni(OH)_2$ and/or mixed hydroxide precipitates. In one or more embodiments, the nickel intermediate feeds comprise, in addition to impurities such as calcium and/or magnesium, metals desirable in the production of materials for batteries, such as nickel, manganese, and/or cobalt.

In one or more embodiments of one or more of the treatment processes wherein the process comprises pre-treating a feedstock comprising calcium and/or magnesium impurities, the pre-treating comprises pre-leaching the feedstock in the presence of a lixiviant, selectively extracting a first portion of the calcium and/or magnesium impurities from the feedstock, and forming a pre-leached feedstock. In one or more embodiments, the lixiviant comprises an acidic aqueous solution. In one or more embodiments, the lixiviant is formed by adding acid to the feedstock in water until the pH is in a range of about 5 to about 9, or about 5 to about 8, or about 5 to about 7, or about 6 to about 7. In one or more embodiments, the acid is sulfuric acid. In one or more embodiments of the process, the lixiviant is a concentrated cobalt sulfate solution. In one or more embodiments of the process, the concentrated cobalt sulfate solution has a concentration $\geq 10$ g/L, $\geq 20$ g/L, $\geq 30$ g/L, $\geq 40$ g/L, $\geq 50$ g/L, $\geq 60$ g/L, $\geq 70$ g/L, $\geq 80$ g/L, $\geq 90$ g/L, $\geq 100$ g/L, $\geq 120$ g/L, $\geq 140$ g/L, $\geq 160$ g/L, $\geq 180$ g/L, or $\geq 200$ g/L, or has any concentration between about 10 g/L and 200 g/L, or has a concentration at any range of concentrations between about 10 g/L and 200 g/L.

In one or more embodiments of one or more of the treatment processes wherein the process comprises pre-leaching the feedstock comprising calcium and/or magnesium impurities, the pre-leaching occurs at a pH of about 5 to about 9, or about 5 to about 8, or about 5 to about 7; or occurs at any pH between about 5 to about 9; or occurs at any range of pH between about 5 to about 9. In one or more embodiments, the pH of the pre-leaching may be maintained by adding additional acid during the process. In one or more embodiments, the pre-leaching occurs at a temperature of about ambient temperature to about 100° C., or about 60° C. to about 100° C., or about 80° C. to about 100° C., or about 80° C. to about 95° C.; or at any temperature between about ambient temperature to about 100° C.; or at any range of temperatures between about ambient temperature to about 100° C.

In one or more embodiments of one or more of the treatment processes wherein the process comprises pre-treating a feedstock comprising calcium and/or magnesium impurities, the pre-treating is conducted as a single-stage pre-leach process. In one or more embodiments, the single stage pre-leach process comprises adding acid to the feedstock in water to form the acidic aqueous lixiviant, pre-leaching the feedstock at a suitable temperature (e.g., about ambient temperature to about 100° C.) and suitable pH (e.g., about 5 to about 9), forming the pre-leached feedstock and a solution comprising the first portion of the calcium and/or magnesium impurities, filtering and separating the pre-leached feedstock from the solution comprising the impurities, and washing the pre-leached feedstock.

In one or more embodiments of one or more of the treatment processes wherein the process comprises pre-treating a feedstock comprising calcium and/or magnesium impurities, the pre-treating is conducted as a multi-stage pre-leach process. In one or more embodiments, the multi-stage pre-leach process comprises a series of single-stage pre-leach processes, where each single-stage process comprises the steps of forming the lixiviant, pre-leaching the feedstock, forming the pre-leached feedstock and the solution comprising the first portion of the calcium and/or magnesium impurities, and filtering and washing the pre-leached feedstock, wherein the pre-leached feedstock of one single-stage process feeds into the next single-stage process. In one or more embodiments, the multi-stage pre-leach process comprises two or three single-stage processes. In one or more embodiments, the multi-stage pre-leach process is conducted co-currently, which involves contacting and flowing the feedstock and lixiviate in the same direction. In one or more embodiments, the multi-stage pre-leach process is conducted counter-currently, which involves contacting and flowing the feedstock and lixiviate in opposing directions.

In one or more embodiments of one or more of the treatment processes wherein the process comprises pre-leaching the feedstock comprising calcium and/or magnesium impurities, the solution comprising the first portion of the calcium and/or magnesium impurities forms because the calcium and/or magnesium impurities are extracted from the feedstock and dissolved into the lixiviant aqueous solutions and/or acidic aqueous solutions during the pre-leaching. In one or more embodiments, the pH and temperature of the single-stage or multi-stage pre-leach processes are selected to selectively extract the calcium and/or magnesium impurities while leaving behind at least a majority of the materials desirable for the production of batteries—such as the metals cobalt, manganese, and/or nickel—in the pre-leached feedstock. In one or more embodiments of the process, selectively extracting the first portion of the calcium and/or magnesium impurities removes that portion of the impurities from the feedstock, thus forming a cleaner/purer pre-leached feedstock that can then be used in the production of materials for batteries, such as crystallized metal sulfates, that meet purity requirements. In one or more embodiments, the process provides crystallized metal sulfates that meet purity requirements for the impurities calcium and/or magnesium. In one or more embodiments, the crystallized metal sulfates comprise crystallized nickel sulfate, manganese sulfate, and/or cobalt sulfate. In one or more embodiments of the process, selectively extracting the first portion of the calcium and/or magnesium impurities from the feedstock comprises selectively extracting out about 50% to about 99%, or about 60% to about 99%, or about 70% to about 99%, or about 80% to about 99% of the calcium and/or magnesium impurities in the feedstock.

In one or more embodiments of one or more of the treatment processes wherein the process comprises pre-leaching the feedstock comprising calcium and/or magnesium impurities, a small amount of the materials desirable for the production of batteries, such as the metals cobalt, manganese, and/or nickel, may be extracted from the feedstock during the pre-leaching and may dissolve into the solution comprising the first portion of the calcium and/or magnesium impurities. To recover these metals, the solution may be treated with a base, such as a metal hydroxide (e.g., KOH or NaOH), to precipitate the cobalt, manganese, and/or nickel as $Co(OH)_2$, $Mn(OH)_2$, and/or $Ni(OH)_2$. The $Co(OH)_2$, $Mn(OH)_2$, and/or $Ni(OH)_2$ may then be isolated and reintroduced into the process, while the remaining solution comprising the first portion of the calcium and/or magnesium impurities can be diverted for further processing or waste disposal.

In one or more embodiments of one or more of the treatment processes wherein the process comprises pre-treating a feedstock comprising calcium and/or magnesium impurities, the process further comprises refining the pre-leached feedstock and forming a leached solution comprising an uncrystallized metal sulfate. In one or more embodiments, refining the pre-leached feedstock comprises leaching the pre-leached feedstock under conditions to form the leached solution comprising an uncrystallized metal sulfate. In one or more embodiments, leaching the pre-leached feedstock under conditions to form the leached solution comprises leaching under conditions to form a sulfate-matrix pregnant leached solution (PLS). There are a number of leaching conditions that may be suitable for forming the leached solution (or PLS). Based on the type or source of feedstock to be processed, a skilled person would recognize which leaching conditions to select and test, in order to confirm the selection and to define the specific conditions. For example, leaching may occur at ambient, or above ambient temperatures and/or pressures. For feedstocks comprising MHP or black mass, leaching may occur at temperatures of about 65° C. and at atmospheric pressures, e.g., with the addition of acid and reducing agents.

In one or more embodiments of one or more of the treatment processes for calcium and/or magnesium impurities wherein the process comprises refining the pre-leached feedstock—following leaching the pre-leached feedstock, refining the pre-leached feedstock may further comprise subjecting the leached solution comprising an uncrystallized metal sulfate (or PLS) to a series of component removal steps to form a refined leached solution comprising an uncrystallized metal sulfate. The type and amount of components to be removed is dependent, at least in part, on the type of feedstock from which the leached solution is formed. When producing materials for battery production, such as producing crystallized metal sulfates, there are specific product specifications (e.g., limits) for such components that are tolerated; and any such components that are present in the process' feedstock, water, or reagents in an amount that exceeds said product specification would need to have their concentration reduced. Examples of components to be removed include, but are not limited to, sodium (Na), aluminum (Al), iron (Fe), copper (Cu), zinc (Zn), cobalt (Co), nickel (Ni), or manganese (Mn). There are many suitable methods for removing components from the leached solution (or PLS). Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of components to be removed, as well as the specifications for the final product (e.g., crystallized metal sulfates) generated by the process. For example, the leached solution may be subjected to a series of component removal steps to remove components such as: Cu (e.g., via solvent extraction, cementation, ion exchange, etc.), Fe and Al (e.g., via precipitation, etc.), and Zn (e.g., via solvent extraction, ion exchange, etc.).

In one or more embodiments of one or more of the treatment processes wherein the process comprises pre-treating a feedstock comprising calcium and/or magnesium impurities, pre-treating the feedstock may not remove all of the calcium and/or magnesium impurities; and as such, the leached solution comprising the uncrystallized metal sulfate may further comprise a second portion of the calcium and/or magnesium impurities from the feedstock. As such, in one or more embodiments of the process, refining the pre-leached feedstock additionally comprises subjecting the refined leached solution comprising the uncrystallized metal sulfate and the second portion of the calcium and/or magnesium impurities to a refining, impurities removal step to remove at least some of the remaining calcium and/or magnesium impurities. In one or more embodiments, the refining, impurities removal step comprises adding a fluoride source to the leached solution, selectively reacting the fluoride source with the second (e.g., remaining) portion of the calcium and/or magnesium impurities and forming calcium and/or magnesium fluoride compounds, and precipitating the calcium and/or magnesium fluoride compounds from the leached solution. In one or more embodiments, the refining, impurities removal step comprises a solvent extraction step that selectively extracts at least the second portion of the calcium and/or magnesium impurities from the leached solution onto, or into a solvent extraction reagent. In one or more embodiments, the solvent extraction step further comprises scrubbing the calcium and/or magnesium impurities from the solvent extraction reagent.

In one or more embodiments of one of the treatment processes for calcium and/or magnesium impurities wherein refining the pre-leached feedstock comprises adding a fluoride source to the leached solution, the calcium and/or magnesium fluoride compounds that precipitate may include $CaF_2$ and/or $MgF_2$. In one or more embodiments, the calcium and/or magnesium fluoride compounds precipitate because of their low solubility in aqueous solutions. In one or more embodiments, the fluoride source that is added is soluble in aqueous solutions. In one or more embodiments, the fluoride source that is added is hydrogen fluoride, sodium fluoride, cobalt fluoride, ammonium fluoride, or a combination thereof. In one or more embodiments, the amount of the fluoride source that is added may be dependent on the amount of calcium and/or magnesium impurities remaining in the leached solution, and/or the process' tolerance of the corrosive properties of fluoride compounds (e.g., equipment's tolerance to corrosion, etc.). In one or more embodiments, amount of the fluoride source that is added may be selected to selectively precipitate the calcium and/or magnesium impurities while leaving behind most, if not all of the metals and/or materials desirable for further downstream processing and/or isolation such as the uncrystallized metal sulfate (e.g., uncrystallized cobalt sulfate, manganese sulfate, and/or nickel sulfate), e.g., for the production of batteries.

In one or more embodiments of one of the treatment processes for calcium and/or magnesium impurities wherein refining the pre-leached feedstock comprises solvent extraction, the solvent extraction may include using organic extractants, solvent extraction reagents, or a combination thereof. In one or more embodiments, organic extractants, solvent extraction reagents comprise the organic phase of the solvent extraction. In one or more embodiments, the organic extractants, or solvent extraction reagents may be selective for extracting any one or combination of calcium and/or magnesium, base metals (e.g., copper, aluminum, zinc), and/or transition metals (e.g., nickel, cobalt, manganese, etc.). In one or more embodiments, the solvent extraction reagent may be Cyanex 272® or equivalent. In one or more embodiments, solvent extraction may occur at an acidic pH. In one or more embodiments, the pH may be between about 4.5 to about 6, or about 5 to about 5.5. In one or more embodiments wherein the solvent extraction further comprises scrubbing, the scrubbing may involve a scrubbing liquor. In one or more embodiments, the scrubbing liquor may comprise a sulfate solution. In one or more embodiments, the sulfate solution may be a metal sulfate solution, wherein the metal may be similar to, or the same metal being targeted for extraction when refining the pre-leached feedstock. In one or more embodiments, the scrubbing conditions may be selected to selectively scrub out the calcium and/or magnesium impurities from the organic extractant, or solvent extraction reagents, while leaving behind most, if not all of the metals and/or materials desirable for further downstream processing and/or isolation, such as the uncrystallized metal sulfate (e.g., uncrystallized cobalt sulfate, manganese sulfate, and/or nickel sulfate). In one or more embodiments, the metals and/or materials desirable for further downstream processing and/or isolation may be stripped from the organic extractant or solvent extraction reagent using dilute acidic solutions, such as dilute sulfuric acid solutions. In one or more embodiments, the stripping may occur at a pH between about 2 to about 4, or about 3 to about 3.5. In one or more embodiments, following extraction, scrubbing, and then stripping, the desired metals and/or materials may be isolated substantially free of calcium and/or magnesium impurities.

In one or more embodiments of one or more of the treatment processes for calcium and/or magnesium impurities wherein the process comprises refining the pre-leached feedstock, the refining, impurities removal step may occur at a pH of about 3 to about 9, or about 3 to about 7, or about 3 to about 5; or about 3 to about 4; or about 3 to about 3.5; or about 5 to about 6; or about 5 to about 5.5; or at any pH between about 3 to about 9; or at any range of pH between about 3 to about 9. In one or more embodiments, the pH of the refining, impurities removal step may be maintained by adding additional acid during the process. In one or more embodiments, the refining, impurities removal step may occur at a temperature of about ambient temperature to about 100° C., or about 20° C. to about 80° C., or about 20° C. to about 60° C., or about 20° C. to about 40° C.; or at any temperature between about 20° C. to about 100° C.; or at any range of temperatures between about 20° C. to about 100° C.

In one or more embodiments of one or more of the treatment processes for calcium and/or magnesium impurities wherein the process comprises refining the pre-leached feedstock, the refining, impurities removal step of selectively forming and precipitating calcium and/or magnesium fluoride compounds, or selectively solvent extracting calcium and/or magnesium impurities removes at least some of the calcium and/or magnesium impurities that may have remained in the pre-leached feedstock following pre-treating, and that have subsequently been extracted into the leached solution comprising the uncrystallized metal sulfate (i.e., the second portion of the calcium and/or magnesium impurities). In one or more embodiments of the process, selectively removing at least the second portion of the calcium and/or magnesium impurities removes that portion of the impurities from the leached solution that were originally from the feedstock and remained in the pre-leached feedstock, thus forming a cleaner/purer leached solution that can then be used in the production of materials for batteries, such as crystallized metal sulfates, that meet purity requirements. In one or more embodiments, selectively removing the second portion of the calcium and/or magnesium impurities comprises selectively removing about 50% to about 99%, or about 60% to about 99%, or about 70% to about 99%, or about 80% to about 99% of the calcium and/or magnesium impurities in the leached solution that were originally in the feedstock, and remained in the pre-leached feedstock.

In one or more embodiments of one or more of the treatment processes for calcium and/or magnesium impurities wherein the process comprises refining the pre-leached feedstock, once the calcium and/or magnesium fluoride compounds are precipitated from the leached solution, they can then be filtered, optionally washed, and either further processed downstream or diverted for waste disposal. Following the removal of the calcium/or magnesium fluoride compounds, the leached solution comprising the uncrystallized metal sulfate can continue on for further processing.

In one or more embodiments of one or more of the treatment processes for calcium and/or magnesium impurities wherein the process comprises refining the pre-leached feedstock, the process further comprises removing residual fluoride source from the leached solution. In one or more embodiments, removing the residual fluoride source comprises selectively reacting the residual fluoride source with a calcium source and forming calcium fluoride compounds, and precipitating the calcium fluoride compounds from the leached solution. In one or more embodiments, the residual fluoride source is at least partially removed, or completely removed. In one or more embodiments, the calcium fluoride compounds comprises $CaF_2$. In one or more embodiments, the calcium source comprises limestone, lime, gypsum, or a combination thereof. In one or more embodiments, the process further comprises removing residual calcium source by ion exchange, solvent extraction, or a combination thereof.

In one or more embodiments of one or more of the treatment processes for calcium and/or magnesium impurities wherein the process comprises refining the pre-leached feedstock, the amount of fluoride source to be added can be selected to remove calcium and/or magnesium impurities to acceptable levels for downstream processes. In one or more embodiments, the amount of fluoride source that remains in the leached solution (e.g., the residual fluoride source) is then removed by the addition of calcium compounds (e.g., a calcium source) such as limestone or lime or gypsum that are substantially free of magnesium. In one or more embodiments, any excess calcium compound(s) that remain (if any) can then be separated from the uncrystallized metal sulfate in the leached solution by, e.g., ion exchange, solvent extraction, or a combination thereof.

In one or more embodiments of one or more of the treatment processes for calcium and/or magnesium impurities wherein the process comprises refining the pre-leached feedstock, the process further comprises removing residual fluoride source, the removing comprising combining the solution comprising the first portion of the calcium and/or magnesium impurities from the pre-leaching step with a crystallizer bleed stream (described in more detail below) that comprises residual fluoride source, selectively reacting the residual fluoride source with the first portion of the calcium and/or magnesium impurities and forming calcium and/or magnesium fluoride compounds, and precipitating the calcium and/or magnesium fluoride compounds from the bleed stream. In one or more embodiments, the residual fluoride source is at least partially removed, or completely removed. In one or more embodiments, the calcium fluoride compounds comprises $CaF_2$.

In one or more embodiments of the treatment process, the process comprises leaching a feedstock comprising calcium and/or magnesium impurities and forming a leached solution comprising an uncrystallized metal sulfate and the calcium and/or magnesium impurities. In one or more embodiments of the process, leaching the feedstock comprises leaching under conditions to form the leached solution comprising an uncrystallized metal sulfate and the calcium and/or magnesium impurities. In one or more embodiments, leaching the feedstock under conditions to form the leached solution comprises leaching under conditions to form a sulfate-matrix pregnant leached solution (PLS). There are a number of leaching conditions that may be suitable for forming the leached solution (or PLS). Based on the type or source of feedstock to be processed, a skilled person would recognize which leaching conditions to select and test, in order to confirm the selection and to define the specific conditions.

In one or more embodiments of the treatment processes wherein the process comprises leaching a feedstock comprising calcium and/or magnesium impurities, the process further comprises refining the leached solution comprising an uncrystallized metal sulfate and the calcium and/or magnesium impurities. In one or more embodiments of the process, refining the leached solution may comprise subjecting the leached solution comprising an uncrystallized metal sulfate and the calcium and/or magnesium impurities (or PLS) to a series of component removal steps to form a refined leached solution. The type and amount of components to be removed is dependent, at least in part, on the type of feedstock from which the leached solution is formed. When producing materials for battery production, such as producing crystallized metal sulfates, there are specific product specifications (e.g., limits) for such components that are tolerated; and any such components that are present in the process' feedstock, water, or reagents in an amount that exceeds said product specification would need to have their concentration reduced. Examples of components to be removed include, but are not limited to, sodium (Na), aluminum (Al), iron (Fe), copper (Cu), zinc (Zn), cobalt (Co), nickel (Ni), or manganese (Mn). There are many suitable methods for removing components from the leached solution (or PLS). Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of components to be removed, as well as the specifications for the final product (e.g., crystallized metal sulfates) generated by the process. For example, the leached solution may be subjected to a series of component removal steps to remove components such as: Cu (e.g., via solvent extraction, cementation, ion exchange, etc.), Fe and Al (e.g., via precipitation, etc.), and Zn (e.g., via solvent extraction, ion exchange, etc.).

In one or more embodiments of the treatment process wherein the process comprises refining the leached solution comprising an uncrystallized metal sulfate and the calcium and/or magnesium impurities, refining the leached solution further comprises subjecting the refined leached solution comprising the uncrystallized metal sulfate and the calcium and/or magnesium impurities to a refining, impurities removal step to remove at least a portion of the calcium and/or magnesium impurities. In one or more embodiments, the refining, impurities removal step comprises adding a fluoride source to the leached solution, selectively reacting the fluoride source with the portion of the calcium and/or magnesium impurities and forming calcium and/or magnesium fluoride compounds, and precipitating the calcium and/or magnesium fluoride compounds from the leached solution.

In one or more embodiments of the treatment process wherein the process comprises refining the leached solution comprising an uncrystallized metal sulfate and the calcium and/or magnesium impurities, the calcium and/or magnesium fluoride compounds that precipitate comprise $CaF_2$ and/or $MgF_2$. In one or more embodiments, the calcium and/or magnesium fluoride compounds precipitate because of their low solubility in aqueous solutions. In one or more embodiments, the fluoride source that is added is soluble in aqueous solutions. In one or more embodiments, the fluoride source that is added is hydrogen fluoride, sodium fluoride, cobalt fluoride, ammonium fluoride, or a combination thereof. In one or more embodiments, the amount of the fluoride source that is added may be dependent on the amount of calcium and/or magnesium impurities in the leached solution, and/or the process' tolerance of the corrosive properties of fluoride compounds (e.g., equipment's tolerance to corrosion, etc.). In one or more embodiments, amount of the fluoride source that is added may be selected to selectively precipitate the calcium and/or magnesium impurities while leaving behind at least a majority of the materials desirable for the production of batteries, such as the uncrystallized metal sulfate (e.g., uncrystallized cobalt sulfate, manganese sulfate, and/or nickel sulfate).

In one or more embodiments of the treatment process wherein the process comprises refining the leached solution comprising an uncrystallized metal sulfate and the calcium and/or magnesium impurities, the refining, impurities removal step occurs at a pH of about 3 to about 9, or about 3 to about 7, or about 3 to about 5; or occurs at any pH between about 3 to about 9; or occurs at any range of pH between about 3 to about 9. In one or more embodiments, the pH of the refining, impurities removal step may be maintained by adding additional acid during the process. In one or more embodiments, the refining, impurities removal step occurs at a temperature of about ambient temperature to about 100° C., or about 20° C. to about 80° C., or about 20° C. to about 60° C., or about 20° C. to about 40° C.; or at any temperature between about 20° C. to about 100° C.; or at any range of temperatures between about 20° C. to about 100° C.

In one or more embodiments of the treatment process wherein the process comprises refining the leached solution comprising an uncrystallized metal sulfate and the calcium and/or magnesium impurities, the refining, impurities removal step of selectively forming and precipitating calcium and/or magnesium fluoride compounds removes at least some of the calcium and/or magnesium impurities in the leached solution comprising the uncrystallized metal sulfate and the calcium and/or magnesium impurities. In one or more embodiments of the process, selectively removing at least a portion of the calcium and/or magnesium impurities removes that portion of the impurities from the leached solution that were originally from the feedstock, thus forming a cleaner/purer leached solution that can then be used in the production of materials for batteries, such as crystallized metal sulfates, that meet purity requirements. In one or more embodiments, selectively removing the portion of the calcium and/or magnesium impurities comprises selectively removing about 50% to about 99%, or about 60% to about 99%, or about 70% to about 99%, or about 80% to about 99% of the calcium and/or magnesium impurities in the leached solution that were originally in the feedstock.

In one or more embodiments of the treatment process wherein the process comprises refining the leached solution comprising an uncrystallized metal sulfate and the calcium and/or magnesium impurities, once the calcium and/or magnesium fluoride compounds are precipitated from the leached solution, they can then be filtered, optionally washed, and either further processed downstream or diverted for waste disposal. Following the removal of the calcium and/or magnesium fluoride compounds, the leached solution comprising the uncrystallized metal sulfate can continue on for further processing.

In one or more embodiments of one or more of the treatment processes for calcium and/or magnesium impurities wherein the process comprises refining the leached solution comprising an uncrystallized metal sulfate and the calcium and/or magnesium impurities, the process further comprises removing residual fluoride source from the leached solution. In one or more embodiments, removing the residual fluoride source comprises selectively reacting the residual fluoride source with a calcium source and forming calcium fluoride compounds, and precipitating the calcium fluoride compounds from the leached solution. In one or more embodiments, the residual fluoride source is at least partially removed, or completely removed. In one or more embodiments, the calcium fluoride compounds comprises $CaF_2$. In one or more embodiments, the calcium source comprises limestone, lime, gypsum, or a combination thereof. In one or more embodiments, the process further comprises removing residual calcium source by ion exchange, solvent extraction, or a combination thereof.

In one or more embodiments of one or more of the treatment processes for calcium and/or magnesium impurities wherein the process comprises refining the leached solution comprising an uncrystallized metal sulfate and the calcium and/or magnesium impurities, the amount of fluoride source to be added can be selected to remove calcium and/or magnesium impurities to acceptable levels for downstream processes. In one or more embodiments, the amount of fluoride source that remains in the leached solution (e.g., the residual fluoride source) is then removed by the addition of calcium compounds (e.g., a calcium source), such as limestone or lime or gypsum, that are substantially free of magnesium. In one or more embodiments, any excess calcium compound(s) that remain (if any) can then be separated from the uncrystallized metal sulfate in the leached solution by, e.g., ion exchange, solvent extraction, or a combination thereof.

In one or more embodiments of one or more of the treatment processes for calcium and/or magnesium impurities, the process further comprises crystallizing the uncrystallized metal sulfate from the leached solution to form a crystallized metal sulfate. In one or more embodiments, crystallizing the uncrystallized metal sulfate comprises introducing the refined, leached solution comprising the uncrystallized metal sulfate into a crystallizer under conditions sufficient to selectively crystalize the uncrystallized metal sulfate. In one or more embodiments, selectively crystallizing the uncrystallized metal sulfate may comprise selectively crystallizing any one or combination of $NiSO_4$ $CoSO_4$, and/or $MnSO_4$, out of solution (e.g., via a forced circulation crystallizer under vacuum, etc., against manganese, etc. depending on the feed material) to produce crystallized metal sulfates in a mother liquor. These crystallized metal sulfates may then be discharged from the crystallizer, thus isolating them from the mother liquor. If one crystallization cycle (e.g., using one crystallizer) is insufficient to produce crystallized metal sulfates (which may occur with dirtier feed materials, for example), the crystals discharged from the crystallizer may be dissolved in pure water before introduction to a second crystallization cycle (e.g., using a second crystallizer) to be recrystallized.

Different types of crystallizers may be suitable for affecting the selective crystallization of the uncrystallized metal sulfate from the leached solution. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of metal sulfate to be crystallized, and/or the type and concentration of impurities in the leached solution. For example, bleeding the mother liquor from the crystallizer during crystallization, and the rates at which the bleeding occurs, can impact the purity of the crystallized metal sulfate; for example, by selectively inhibiting crystallization of impurities. Selecting a bleed rate to selectively inhibit crystallization of a specific impurity refers to setting a crystallizer bleed rate, within a range of possible bleed rates that inhibits the crystallization of the specific impurity more so than it would inhibit crystallization of a different impurity. The bleed rate may be selected such that it maximizes inhibiting crystallization of the specific impurity. The impurities may be sodium, potassium, etc. Using a higher bleed rate of the mother liquor helps to maintain lower concentrations of impurities and other components in the mother liquor that could impact the purity of the crystallized metal sulfates. Further, impurity solubility can be temperature dependent; therefore, selecting the crystallizer temperatures as well as the crystallizer bleed rates can be effective in managing the purity of the metal sulfate(s) being crystallized. Impurity solubility can also be dependent on the amount of free water present in the leached solution and/or mother liquor; therefore, managing water levels in the crystallizer can be an effective means of managing the purity of the metal sulfate(s) being crystallized. For example, in some instances, the metal sulfate crystallizes out of solution as metal-sulfate hydrates (i.e., crystallized metal sulfates and water molecules combined in a definite ratio as an integral part of the crystal), which reduces the concentration of water in the mother liquor. By decreasing the concentration of free water, the concentration of impurities (e.g. sodium, potassium, etc.) in the mother liquor may also increase to the point that they crystallize out of solution and impact the purity of the crystallized metal sulfates. However, if a sufficient amount of water is added to the leached solution and/or mother liquor when in the crystallizer, or if that amount of excess water remains in the leached solution after upstream treatment (e.g., at least as much water as is expected to be lost due to hydrate formation), the presence of that free water can inhibit the crystallization of impurities out of solution.

After crystallization, the mother liquor may still contain undesired salts/metals (e.g., $Li_2SO_4$, Mg, Na, etc.), as well as remaining, uncrystallized metal sulfate. To selectively recover the remaining, uncrystallized metal sulfates from the remaining undesired materials in solution, the mother liquor is 'bled' from the crystallizer, and basified to convert the uncrystallized metal sulfate to an insoluble, basic metal salt (e.g., metal hydroxides such as $Ni(OH)_2$, $Co(OH)_2$, Mn $(OH)_2$, etc.). The resultant basic metal salt (e.g., metal hydroxides) precipitate from the mother liquor, and may be isolated from the mother liquor via filtration. For example, the basic metal salt may be recovered by filtration, thickening and filtration, or centrifugation. The resultant precipitated metal hydroxides may also be washed or re-pulped to form a slurry, but are then used up-stream to neutralize acids introduced at the leaching and/or component removal stages of the process, thus converting the metal hydroxides back to uncrystallized metal sulfates that can then be isolated via crystallization downstream. Using the basic metal salt (e.g., metal hydroxides) as a neutralizing agent reduces and/or eliminates the need to introduce external neutralizing agents; this reduces reagent use (and associated costs), and reduces and/or eliminates additional sources of impurities that may impact product purity (e.g., cations $Na^+$, $K^+$, $Li^+$, $Ca^{2+}$, $Mg^{2+}$ from the external neutralizing agent), that would otherwise require the crystallizer bleed rate to be higher to avoid co-precipitation of the impurities and contamination of the crystallized metal sulfates. In some instances, to ensure that there is a sufficient amount of basic metal salts, e.g., metal hydroxides, available for use as a neutralizing agent, the rate at which the mother liquor is bled from the crystallizer and basified to form the metal hydroxides may be controlled such that the amount of metal hydroxides formed is at least approximately equivalent to, or approximately equivalent to the amount of acid introduced at the leaching and/or refining stages. Further, using the basic metal salts (e.g., metal hydroxides) as a neutralizing agent converts the basic metal salts back to metal sulfates within the leached solution. The leached solution, comprising the converted metal sulfates, then proceeds on to the crystallizer, wherein the converted metal sulfates may be crystallized and isolated from the mother liquor. This loop of isolating and basifying the mother liquor to convert uncrystallised metal sulfates in solution to basic metal salts, and using those basic metal salts as neutralizing agents to convert the basic metal salts back to metal sulfates that can then be isolated via crystallization, can improve the yield of isolated, crystallized metal sulfates obtained from a particular feedstock.

In one or more embodiments of one or more of the treatment processes for calcium and/or magnesium impurities, crystallizing the uncrystallized metal sulfate comprises crystallizing the metal sulfate from the leached solution to form a crystallized metal sulfate in a mother liquor, the mother liquor comprising remaining uncrystallized metal sulfate; separating the crystallized metal sulfate from the mother liquor; basifying a portion of the mother liquor to convert the remaining uncrystallized metal sulfate to a basic metal salt; and using the basic metal salt upstream of crystallizing the metal sulfate. In one or more embodiments, using the basic metal salt upstream comprises converting the basic metal salt back to the uncrystallized metal sulfate. In one or more embodiments, converting the basic metal salt back to the uncrystallized metal sulfate comprises using the basic metal salt to neutralize acid upstream of crystallizing the metal sulfate. In one or more embodiments, the basic metal salt comprises a metal hydroxide. In one or more embodiments, the metal hydroxide comprises any one or a combination of nickel hydroxide, cobalt hydroxide, or manganese hydroxide.

In one or more embodiments of one or more of the treatment processes for calcium and/or magnesium impurities wherein the process comprises pre-treating a feedstock and refining a pre-leached feedstock, the leached solution comprising the uncrystallized metal sulfate—formed by refining the pre-leached feedstock—may comprise the refined leached solution that is introduced into the crystallizer; or it may be the mother liquor bled from the crystallizer. As such, in one or more embodiments of the process, the refining, impurities removal step of selectively forming and precipitating calcium and/or magnesium fluoride compounds may be performed on the leached solution before it is introduced into the crystallizer; or, it may be performed on the mother liquor.

In one or more embodiments of the treatment process for calcium and/or magnesium impurities wherein the process comprises leaching a feedstock and refining a leached solution comprising an uncrystallized metal sulfate and calcium and/or magnesium impurities, the leached solution may comprise the refined leached solution that is introduced into the crystallizer; or it may be the mother liquor bled from the crystallizer. As such, in one or more embodiments of the process, the refining, impurities removal step of selectively forming and precipitating calcium and/or magnesium fluoride compounds may be performed on the leached solution before it is introduced into the crystallizer; or, it may be performed on the mother liquor.

In one or more embodiments of one or more of the treatment processes wherein the process comprises pre-leaching the feedstock comprising calcium and/or magnesium impurities, there is provided a treatment process as depicted in FIG. 1, wherein the feedstock is an intermediate feed stock comprising Co; the feedstock is pre-leached to remove a first portion of the calcium and/or magnesium impurities and form a pre-leached feedstock and a solution comprising the calcium and/or magnesium impurities; the solution comprising the impurities is basified to precipitate out $Ca(OH)_2$ for use upstream in the process; the pre-leached feedstock is then leached and subjected to component removal steps; the refined, leached solution comprising an uncrystallized metal sulfate is introduced into a crystallizer and $CoSO_4$ is crystallized out; and the refining, impurities removal step of selectively forming and precipitating calcium and/or magnesium fluoride compounds is performed on the mother liquor bled from the crystallizer to remove a second portion of the calcium and/or magnesium impurities.

Figure 2:
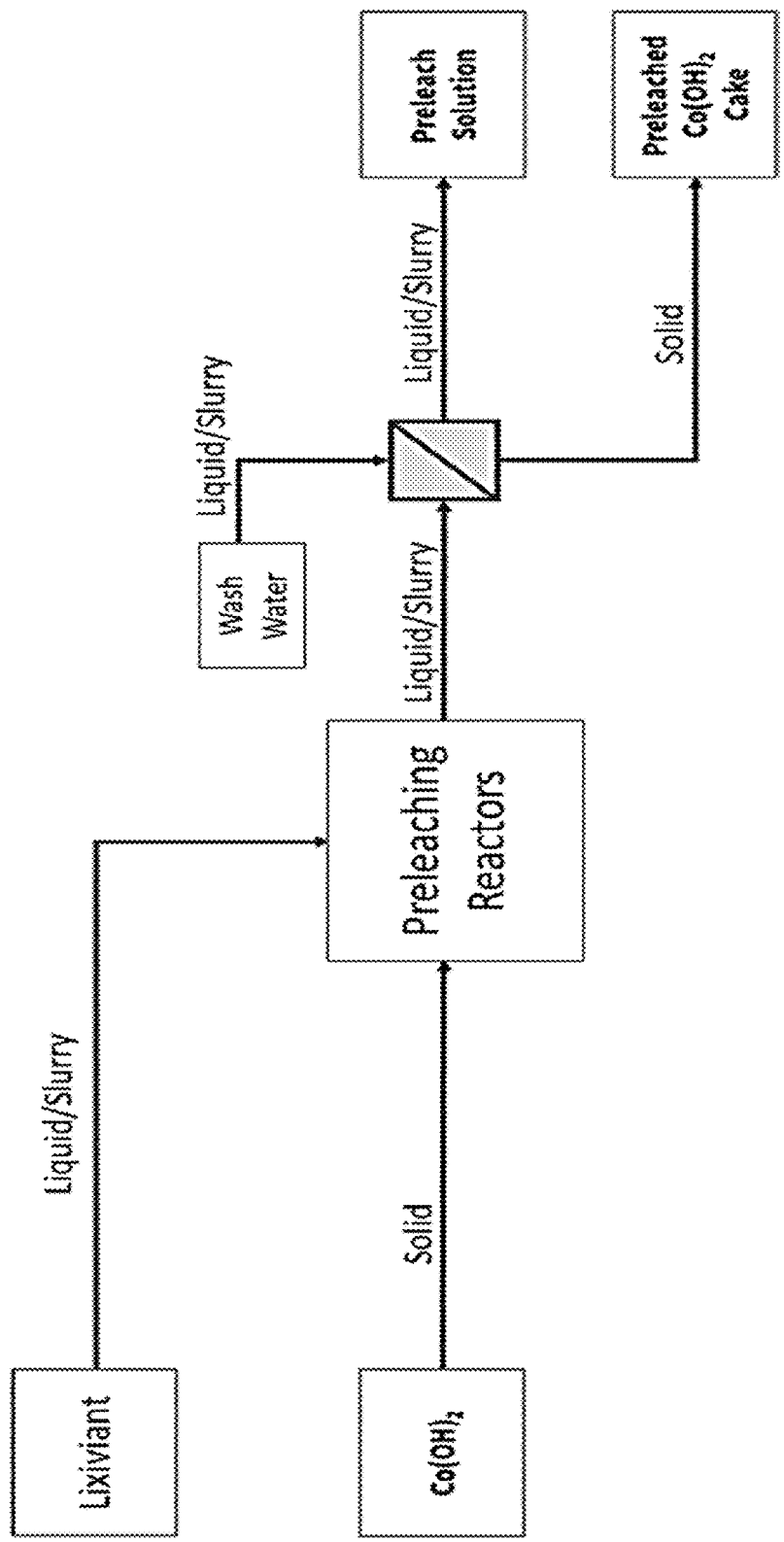
FIG. 2 depicts a single-stage pre-leach process as part of a treatment process for crystallizing a metal sulfate involving a feedstock that comprises calcium and/or magnesium impurities.

In one or more embodiments of one or more of the treatment processes wherein the process comprises pre-leaching the feedstock comprising calcium and/or magnesium impurities, there is provided a single-stage pre-leach process as depicted in FIG. 2, wherein an intermediate feed stock comprising $Co(OH)_2$ is mixed with a lixiviant in a pre-leaching reactor to form a pre-leached feedstock comprising a pre-leached $Co(OH)_2$ cake and a pre-leached solution comprising at least a first portion of the calcium and/or magnesium impurities.

Figure 3:
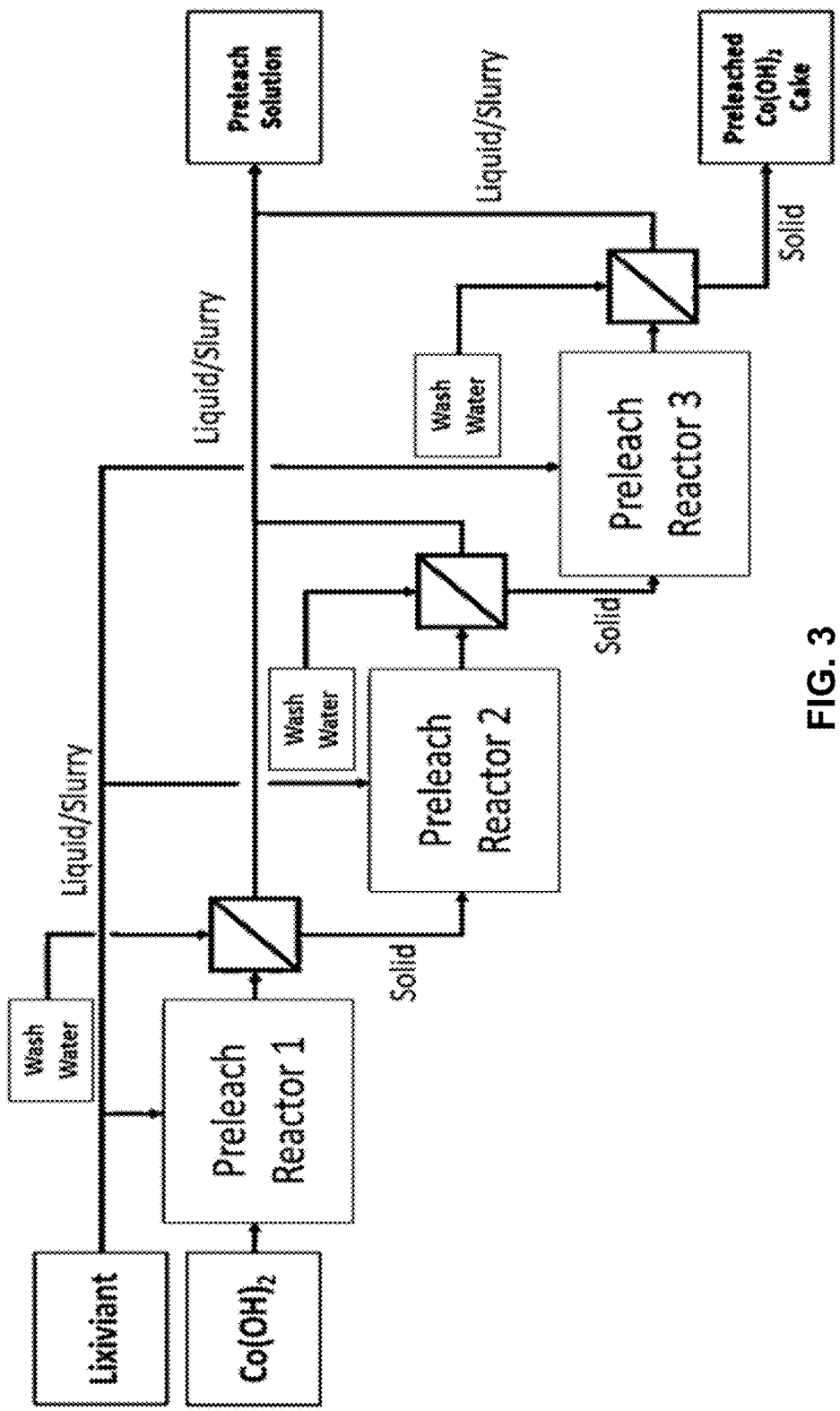
FIG. 3 depicts a co-current, multi-stage pre-leach process as part of a treatment process for crystallizing a metal sulfate involving a feedstock that comprises calcium and/or magnesium impurities.

In one or more embodiments of one or more of the treatment processes wherein the process comprises pre-leaching the feedstock comprising calcium and/or magnesium impurities, there is provided a co-current, multi-stage pre-leach process as depicted in FIG. 3, wherein an intermediate feed stock comprising $Co(OH)_2$ is mixed with a lixiviant across a series of single-stage pre-leaching reactors to form a pre-leached feedstock comprising a pre-leached $Co(OH)_2$ cake and a pre-leached solution comprising at least a first portion of the calcium and/or magnesium impurities.

Figure 4:
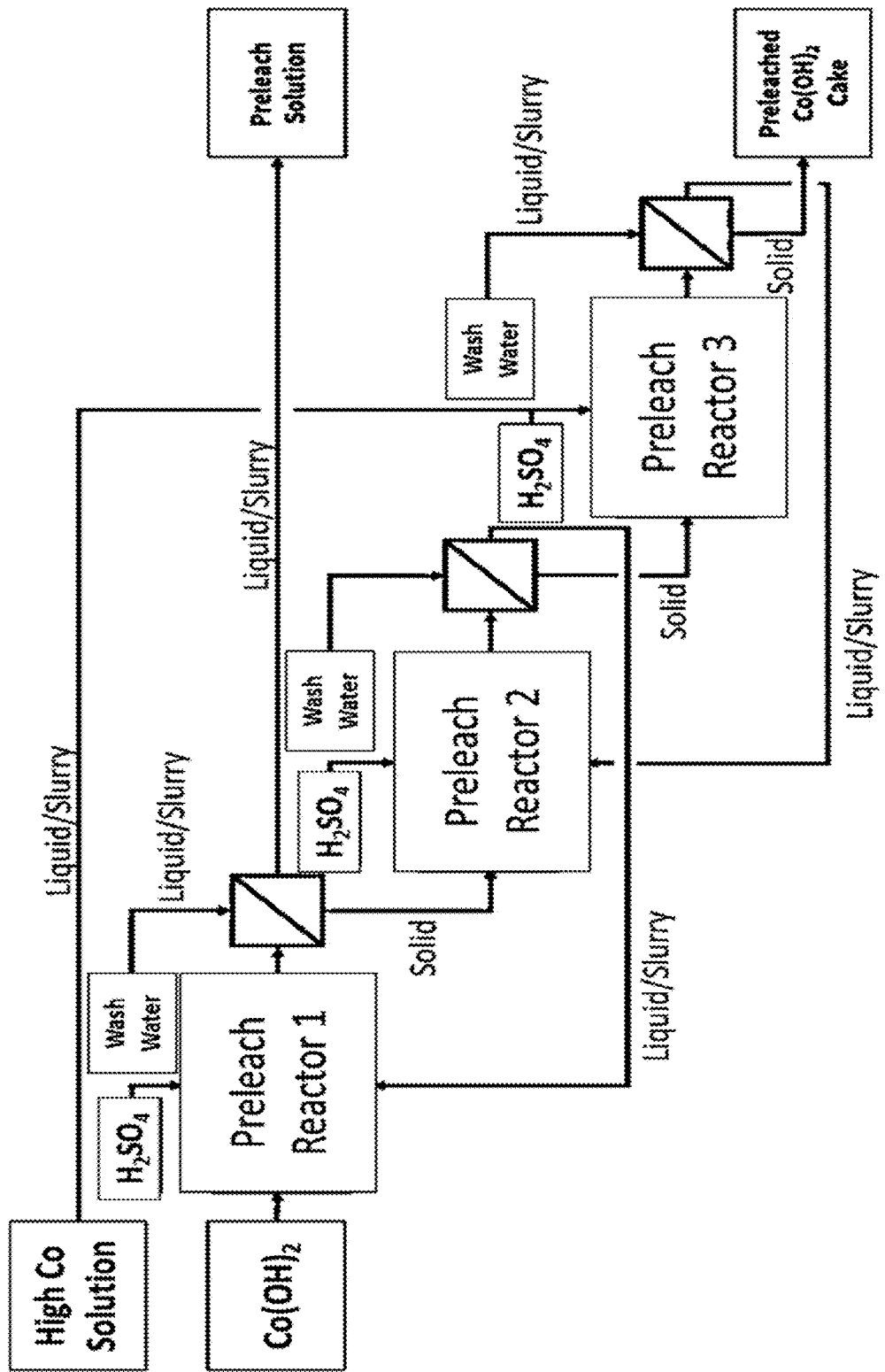
FIG. 4 depicts a counter-current, multi-stage pre-leach process as part of a treatment process for crystallizing a metal sulfate involving a feedstock that comprises calcium and/or magnesium impurities.

In one or more embodiments of one or more of the treatment processes wherein the process comprises pre-leaching the feedstock comprising calcium and/or magnesium impurities, there is provided a counter-current, multi-stage pre-leach process as depicted in FIG. 4, wherein an intermediate feed stock comprising $Co(OH)_2$ is counter-currently mixed with a Co-solution lixiviant across a series of single-stage pre-leaching reactors to form a pre-leached feedstock comprising a pre-leached $Co(OH)_2$ cake and a pre-leached solution comprising at least a first portion of the calcium and/or magnesium impurities.

Figure 5:
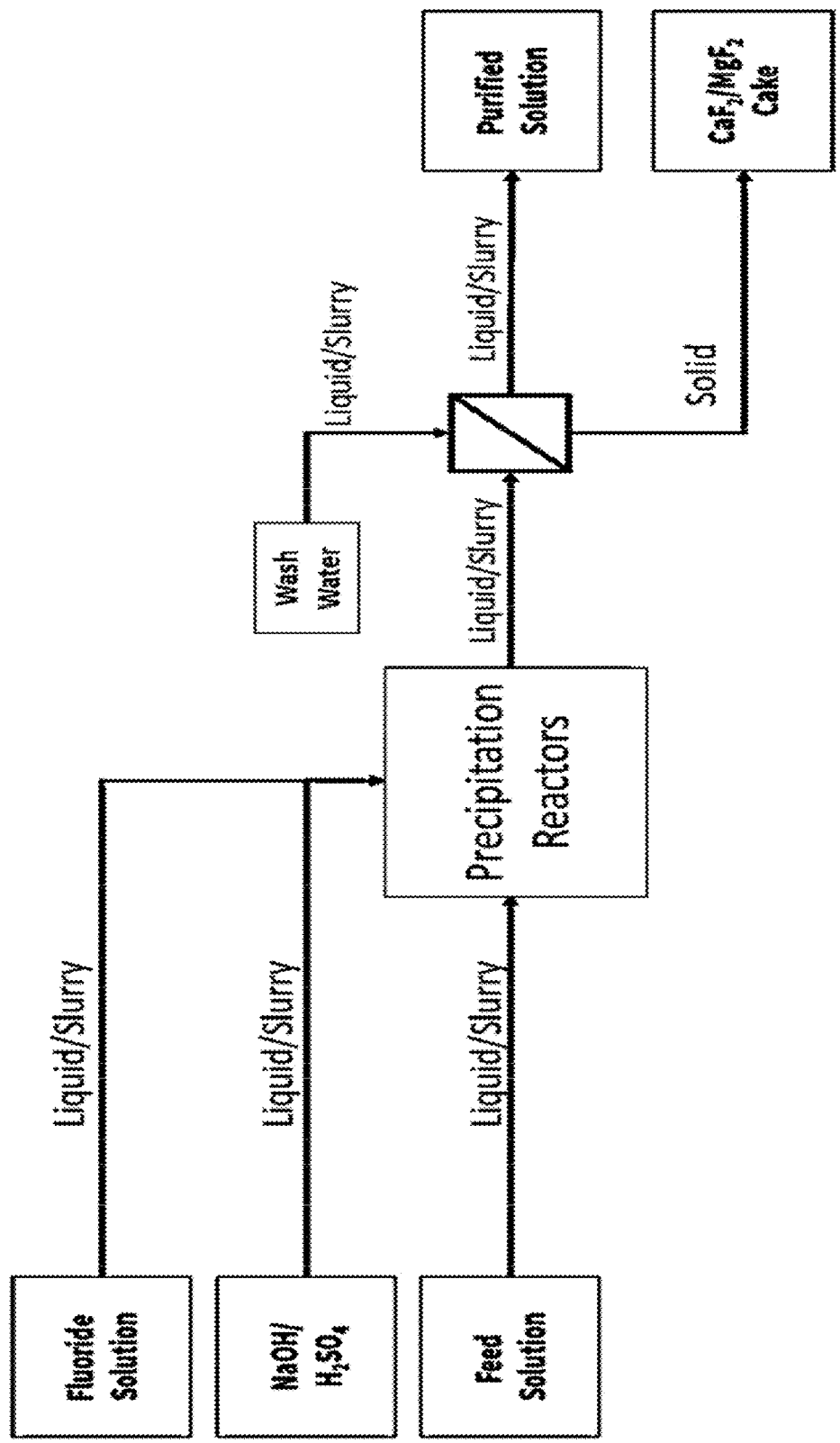
FIG. 5 depicts a refining, impurities removal step as part of a treatment process for crystallizing a metal sulfate involving a feedstock that comprises calcium and/or magnesium impurities.

In one or more embodiments of one or more of the treatment processes for calcium and/or magnesium impurities, there is provided refining, impurities removal step of selectively forming and precipitating calcium and/or magnesium fluoride compounds as depicted in FIG. 5, wherein a feed solution is mixed with a fluoride solution under acidic and/or basic conditions in a precipitation reactor to form a refined, leached solution (e.g., purified solution) and a precipitated $CaF_2$ and/or $MgF_2$ cake.

Figure 9:
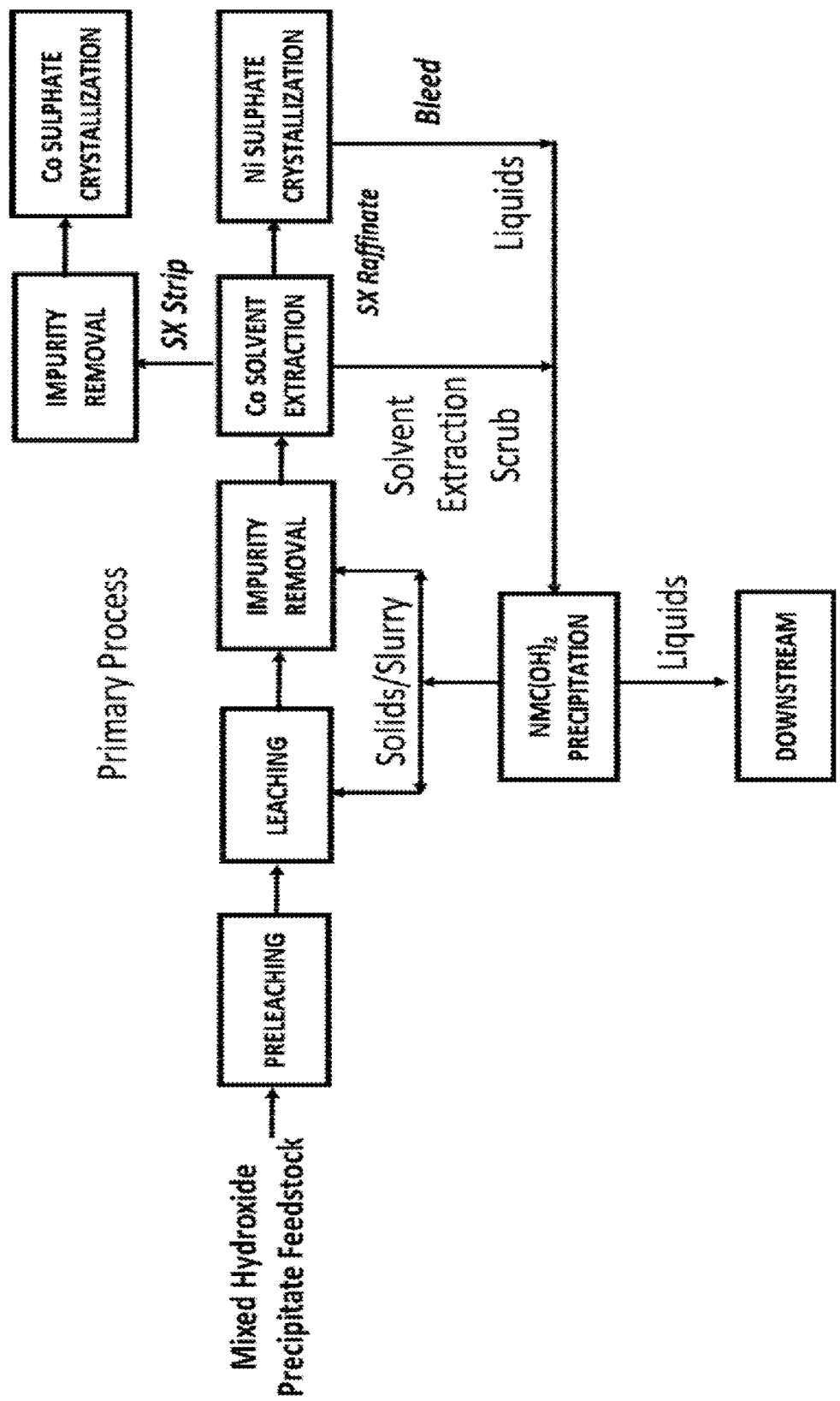
FIG. 9 depicts a treatment process for crystallizing a metal sulfate involving a mixed hydroxide precipitate intermediate feedstock that comprises calcium and/or magnesium impurities.

In one or more embodiments of one of the treatment processes wherein the process comprises pre-leaching the feedstock comprising calcium and/or magnesium impurities, there is provided a treatment process as depicted in FIG. 9, wherein the feedstock is an intermediate feed stock comprising mixed hydroxide precipitates; the feedstock is pre-leached to remove a first portion of the calcium and/or magnesium impurities and form a pre-leached feedstock; the pre-leached feedstock is then leached and subjected to component removal steps, where the component removal steps include impurity removal steps and a solvent extraction step, such as a Co solvent extraction step, to remove a second portion of the calcium and/or magnesium impurities; the refined, leached solution comprising an uncrystallized metal sulfate is introduced into a crystallizer and a metal sulfate, such as nickel sulfate, is crystallized out; the mother liquor from the crystallizer is bled and basified to form Ni, Mn, and/or Co hydroxides, which are used upstream of the crystallizer as neutralizing agents, or downstream for further processing; and the refining, impurities removal step of selectively extracting calcium and/or magnesium impurities further involves a scrubbing step to remove the extracted second portion of calcium and/or magnesium impurities and a stripping step to isolate desired material, such as cobalt sulfate, that can then be further crystallized.

For example, the Co solvent extraction (SX) step may involve using a solvent extraction (SX) reagent that extracts cobalt, such as Cyanex 272® or equivalent; and loading calcium and/or magnesium impurities, as well as cobalt, onto the SX reagent during the SX as the pH is raised to about 5-5.5. In some instances, a smaller proportion of, e.g., nickel (e.g., about 10%) may also be loaded onto the reagent. As part of the SX, the calcium and/or magnesium, as well as perhaps the nickel, may be scrubbed from the SX reagent in a scrubbing stage that uses, e.g., a cobalt sulfate solution as a scrubbing liquor that may or may not be slightly acidified (e.g., pH may be lower than the extraction stage). The scrubbing stage may remove most if not all of the calcium and/or magnesium, and perhaps nickel, such that the aqueous liquid that exits the scrubbing stage contains scrubbed calcium and/or magnesium, and perhaps nickel, as well as the remaining cobalt from the scrubbing liquor. This liquid may be sent to a nickel/cobalt recovery step, where nickel and cobalt can be precipitated and separated from the calcium and/or magnesium and returned to the process circuit. The calcium and/or magnesium in this liquid may then pass to a separate recovery step. The cobalt that is extracted into the SX reagent may be stripped from the reagent using dilute acid, e.g., sulfuric acid, at a pH of approximately 3-3.5. So stripped, the cobalt can be substantially free of calcium and/or magnesium, and suitable to be further purified before being crystallized as cobalt sulfate.

In one or more embodiments of one or more of the treatment processes for calcium and/or magnesium impurities, the metal sulfate comprises any combination of the nickel sulfate, manganese sulfate, and/or cobalt sulfate. In one or more embodiments of the process, crystallizing the uncrystallized metal sulfate comprises selectively crystallizing any one or two of the nickel sulfate, manganese sulfate, and cobalt sulfate from the leached solution. In one or more embodiments of the process, crystallizing the uncrystallized metal sulfate comprises selectively crystallizing any combination of the nickel sulfate, manganese sulfate, and cobalt sulfate from the leached solution. In one or more embodiments of the process, the crystallized metal sulfate is a battery-grade crystallized metal sulfate, or an electroplating-grade crystallized metal sulfate.

In one or more embodiments of one or more of the treatment processes for calcium and/or magnesium impurities, the pre-leaching process, precipitation of calcium and/or magnesium fluoride compounds, and/or selective solvent extraction of calcium and/or magnesium impurities reduces or eliminates calcium and/or magnesium impurity levels in the leached solution comprising the uncrystallized metal sulfate, such that—when the leached solution is introduced into the crystallizer—there is an increase in the single-pass product yield relative to when the pre-leaching process, precipitation of calcium and/or magnesium fluoride compounds, and/or selective solvent extraction of calcium and/or magnesium impurities does not occur. In one or more embodiments of one or more of the treatment processes for calcium and/or magnesium impurities, the pre-leaching process, precipitation of calcium and/or magnesium fluoride compounds, and/or selective solvent extraction of calcium and/or magnesium impurities reduces or eliminates calcium and/or magnesium impurity levels in the leached solution comprising the uncrystallized metal sulfate, such that—when the leached solution is introduced into the crystallizer—the crystallizer bleed rates can be reduced relative to when the pre-leaching process, precipitation of calcium and/or magnesium fluoride compounds, and/or selective solvent extraction of calcium and/or magnesium impurities does not occur. In one or more embodiments wherein there is an increase in the single-pass product yield, or a decrease in crystallizer bleed rates, there is a reduction in CAPEX and OPEX costs. In one or more embodiments of the process, the pre-leaching process, precipitation of calcium and/or magnesium fluoride compounds, and/or selective solvent extraction of calcium and/or magnesium impurities reduces or eliminates calcium and/or magnesium impurity levels in the leached solution comprising the uncrystallized metal sulfate, such that the process provides crystallized metal sulfates that meet purity requirements for calcium and/or magnesium impurities.

Treatment Processes for Feedstocks Comprising Lithium Impurities

In one or more embodiments of the present disclosure, there is provided a treatment process for crystallizing a metal sulfate, the process comprising:
  pre-treating a feedstock comprising lithium impurities, the pre-treating comprising
  pre-leaching the feedstock in the presence of a lixiviant,
  selectively extracting a first portion of the lithium impurities from the feedstock, and
  forming a pre-leached feedstock;
  refining the pre-leached feedstock and forming a leached solution comprising an uncrystallized metal sulfate; and
  crystallizing the uncrystallized metal sulfate from the leached solution to form a crystallized metal sulfate in a mother liquor, the mother liquor comprising a remaining uncrystallized metal sulfate;
  separating the crystallized metal sulfate from the mother liquor;
  basifying a portion of the mother liquor to convert the remaining uncrystallized metal sulfate to a basic metal salt; and
  using the basic metal salt upstream of crystallizing the metal sulfate.

In one or more embodiments of the present disclosure, there is provided a treatment process for crystallizing a metal sulfate, the process comprising:
  pre-treating a feedstock comprising lithium impurities, the pre-treating comprising pre-leaching the feedstock in the presence of a lixiviant, selectively extracting a first portion of the lithium impurities from the feedstock, and forming a pre-leached feedstock;

refining the pre-leached feedstock and forming a leached solution comprising an uncrystallized metal sulfate; and crystallizing the uncrystallized metal sulfate from the leached solution to form a crystallized metal sulfate.

In one or more embodiments of the present disclosure, there is provided a treatment process wherein the leached solution comprising an uncrystallized metal sulfate further comprises a second portion of the lithium impurities from the feedstock, and the refining comprises selectively extracting at least a second portion of the lithium impurities by direct lithium extraction.

In one or more embodiments of the present disclosure, there is provided a treatment process for crystallizing a metal sulfate, the process comprising:

leaching a feedstock comprising lithium impurities and forming a leached solution comprising an uncrystallized metal sulfate and the lithium impurities;

refining the leached solution, the refining comprising selectively extracting a portion of the lithium impurities by direct lithium extraction;

crystallizing the uncrystallized metal sulfate from the leached solution to form a crystallized metal sulfate in a mother liquor, the mother liquor comprising a remaining uncrystallized metal sulfate;

separating the crystallized metal sulfate from the mother liquor;

basifying a portion of the mother liquor to convert the remaining uncrystallized metal sulfate to a basic metal salt; and using the basic metal salt upstream of crystallizing the metal sulfate.

In one or more embodiments of the present disclosure, there is provided a treatment process for crystallizing a metal sulfate, the process comprising:

leaching a feedstock comprising lithium impurities and forming a leached solution comprising an uncrystallized metal sulfate and the lithium impurities;

refining the leached solution, the refining comprising selectively extracting a portion of the lithium impurities by direct lithium extraction; and crystallizing the uncrystallized metal sulfate from the leached solution to form a crystallized metal sulfate.

In one or more embodiments of one or more of the treatment processes for lithium impurities, the feedstock comprises battery feeds. In one or more embodiments, the feedstock comprises recycled battery feeds. In one or more embodiments, the feedstock comprises black mass feeds from batteries. In one or more embodiments, any one of the battery feeds comprise, in addition to impurities such as lithium, metals desirable in the production of materials for batteries, such as cobalt, manganese, and/or nickel.

In one or more embodiments of one or more of the treatment processes wherein the process comprises pre-treating a feedstock comprising lithium impurities, the pre-treating comprises pre-leaching the feedstock in the presence of a lixiviant, selectively extracting a first portion of the lithium impurities from the feedstock, and forming a pre-leached feedstock. In one or more embodiments, the lixiviant comprises an aqueous solution, an aqueous solution comprising an oxidant, an acidic aqueous solution, or an acidic aqueous solution comprising an oxidant. In one or more embodiments, the lixiviant is formed by adding acid with or without an oxidant to the feedstock in water until the pH is in a range of about 5 to about 9, or about 5 to about 8, or about 5 to about 7, or about 6 to about 7. In one or more embodiments, the acid is sulfuric acid. In one or more embodiments, the oxidant is sodium persulfate, ozone, or sodium hypochlorite. In one or more embodiments, the oxidant is added in an amount of <1 mol oxidant per mol of metals desirable in the production of materials for batteries, such as cobalt, manganese, and/or nickel. In one or more embodiments, the oxidant is added in an amount of about 0.5 mol/mol of cobalt, manganese, and/or nickel; or is added in an amount of about 0.3 mol/mol of cobalt, manganese, and/or nickel.

In one or more embodiments of one or more of the treatment processes wherein the process comprises pre-leaching the feedstock comprising lithium impurities, the pre-leaching occurs at a pH of about 5 to about 9, or about 5 to about 8, or about 5 to about 7; or occurs at any pH between about 5 to about 9; or occurs at any range of pH between about 5 to about 9. In one or more embodiments, the pH of the pre-leaching may be maintained by adding additional acid during the process. In one or more embodiments, the pre-leaching occurs at a temperature of about ambient temperature to about 100° C., or about 60° C. to about 100° C., or about 80° C. to about 100° C., or about 80° C. to about 95° C.; or at any temperature between about ambient temperature to about 100° C.; or at any range of temperatures between about ambient temperature to about 100° C.

In one or more embodiments of one or more of the treatment processes wherein the process comprises pre-treating a feedstock comprising lithium impurities, the pre-treating is conducted as a single-stage pre-leach process. In one or more embodiments, the single stage pre-leach process comprises adding acid with or without oxidant to the feedstock in water to form the acidic aqueous lixiviant, pre-leaching the feedstock at a suitable temperature (e.g., about ambient temperature to about 100° C.) and suitable pH (about 5 to about 9), forming the pre-leached feedstock and a solution comprising the first portion of the lithium impurities, filtering and separating the pre-leached feedstock from the solution comprising the impurities, and washing the pre-leached feedstock.

In one or more embodiments of one or more of the treatment processes wherein the process comprises pre-treating a feedstock comprising lithium impurities, the pre-treating is conducted as a multi-stage pre-leach process. In one or more embodiments, the multi-stage pre-leach process comprises a series of single-stage pre-leach processes, where each single-stage process comprises the steps of forming the lixiviant, pre-leaching the feedstock, forming the pre-leached feedstock and the solution comprising the first portion of the lithium impurities, and filtering and washing the pre-leached feedstock, wherein the pre-leached feedstock of one single-stage process feeds into the next single-stage process. In one or more embodiments, the multi-stage pre-leach process comprises two or three single-stage processes. In one or more embodiments, the multi-stage pre-leach process is conducted co-currently, which involves contacting and flowing the feedstock and lixiviate in the same direction. In one or more embodiments, the multi-stage pre-leach process is conducted counter-currently, which involves contacting and flowing the feedstock and lixiviate in opposing directions.

In one or more embodiments of one or more of the treatment processes wherein the process comprises pre-leaching the feedstock comprising lithium impurities, the solution comprising the first portion of the lithium impurities forms because the lithium impurities are extracted from the feedstock and dissolved into the lixiviant aqueous solutions with or without oxidant, or acidic aqueous solutions with or without oxidant during the pre-leaching. In one or more embodiments, the pH and temperature of the single-stage or multi-stage pre-leach processes are selected to selectively extract the lithium impurities while leaving behind at least a majority of the materials desirable for the production of batteries, such as the metals cobalt, manganese, and/or nickel, in the pre-leached feedstock. In one or more embodiments of the process, selectively extracting the first portion of the lithium impurities removes that portion of the impurities from the feedstock, thus forming a cleaner/purer pre-leached feedstock that can then be used in the production of materials for batteries, such as crystallized metal sulfates, that meet purity requirements. In one or more embodiments of the process, selectively extracting the first portion of the lithium impurities from the feedstock comprises selectively extracting out about 20% to about 70%, or about 30% to about 70%, or about 40% to about 70%, or about 50% to about 70%, or about 60% to about 70% of the lithium impurities in the feedstock. In one or more embodiments, selectively extracting the first portion of the lithium impurities comprises selectively extracting out about 20% to about 30% of the lithium impurities in the feedstock when the lixiviant is an acidic aqueous solution. In one or more embodiments, selectively extracting the first portion of the lithium impurities comprises selectively extracting out about 60% to about 70% of the lithium impurities in the feedstock when the lixiviant is an acidic aqueous solution comprising an oxidant.

In one or more embodiments of one or more of the treatment processes wherein the process comprises pre-leaching the feedstock comprising lithium impurities, a small amount of the materials desirable for the production of batteries, such as the metals cobalt, manganese, and/or nickel, may be extracted from the feedstock during the pre-leaching and may dissolve into the solution comprising the first portion of the lithium impurities. To recover these metals, the solution may be treated with a base, such as a metal hydroxide (e.g., KOH or NaOH), to precipitate the cobalt, manganese, and/or nickel as $Co(OH)_2$, $Mn(OH)_2$, and/or $Ni(OH)_2$. The $Co(OH)_2$, $Mn(OH)_2$, and/or $Ni(OH)_2$ may then be isolated and reintroduced into the process, while the remaining solution comprising the first portion of the lithium impurities can be diverted for further processing or waste disposal.

In one or more embodiments of one or more of the treatment processes wherein the process comprises pre-treating a feedstock comprising lithium impurities, the process further comprises refining the pre-leached feedstock and forming a leached solution comprising an uncrystallized metal sulfate. In one or more embodiments, refining the pre-leached feedstock comprises leaching the pre-leached feedstock under conditions to form the leached solution comprising an uncrystallized metal sulfate. In one or more embodiments, leaching the pre-leached feedstock under conditions to form the leached solution comprises leaching under conditions to form a sulfate-matrix pregnant leached solution (PLS). There are a number of leaching conditions that may be suitable for forming the leached solution (or PLS). Based on the type or source of feedstock to be processed, a skilled person would recognize which leaching conditions to select and test, in order to confirm the selection and to define the specific conditions.

In one or more embodiments of one or more of the treatment processes for lithium impurities wherein the process comprises refining the pre-leached feedstock, refining the pre-leached feedstock, following leaching the pre-leached feedstock, may further comprise subjecting the leached solution comprising an uncrystallized metal sulfate (or PLS) to a series of component removal steps to form a refined leached solution comprising an uncrystallized metal sulfate. The type and amount of components to be removed is dependent, at least in part, on the type of feedstock from which the leached solution is formed. When producing materials for battery production, such as producing crystallized metal sulfates, there are specific product specifications (e.g., limits) for such components that are tolerated; and any such components that are present in the process' feedstock, water, or reagents in an amount that exceeds said product specification would need to have their concentration reduced. Examples of components to be removed include, but are not limited to, sodium (Na), aluminum (Al), iron (Fe), copper (Cu), zinc (Zn), cobalt (Co), nickel (Ni), or manganese (Mn). There are many suitable methods for removing components from the leached solution (or PLS). Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of components to be removed, as well as the specifications for the final product (e.g., crystallized metal sulfates) generated by the process. For example, the leached solution may be subjected to a series of component removal steps to remove components such as: Cu (e.g., via solvent extraction, cementation, ion exchange, etc.), Fe and Al (e.g., via precipitation, etc.), and Zn (e.g., via solvent extraction, ion exchange, etc.).

In one or more embodiments of one or more of the treatment processes wherein the process comprises pre-treating a feedstock comprising lithium impurities, pre-treating the feedstock may not remove most or all of the lithium impurities; and as such, the leached solution comprising the uncrystallized metal sulfate may further comprises a second portion of the lithium impurities from the feedstock. As such, in one or more embodiments of the process, refining the pre-leached feedstock additionally comprises subjecting the leached solution comprising the uncrystallized metal sulfate to a refining, impurities removal step to remove at least some of the remaining lithium impurities. In one or more embodiments, the refining, impurities removal step comprises selectively extracting the second portion of the lithium impurities by direct lithium extraction.

Generally, direct lithium extraction (DLE) is considered a type of recovery technique in which lithium is removed from a brine or aqueous solution to create a higher purity lithium concentrate for, e.g., refining into battery quality lithium chemical products. DLE generally relies on chemical or physical selective characteristics of a material to remove lithium from brine while leaving other salts in the starting solution. In one or more embodiments of one or more of the treatment processes for lithium impurities wherein the process comprises refining the pre-leached feedstock, the direct lithium extraction (DLE) comprises selective extraction techniques in which lithium impurities are removed from the leached solution while leaving behind at least a majority of the materials desirable for the production of batteries, such as the metals cobalt, manganese, and/or nickel. In one or more embodiments, the direct lithium extraction comprises selectively extracting the lithium impurities using ion-exchange media, organic extractants, membranes, or a combination thereof. In one or more embodiments, the ion-exchange media comprises layered aluminate lithium sorbents. In one or more embodiments, the layered aluminate lithium sorbents selectively extract lithium impurities under pH neutral conditions or weakly acidic conditions. In one or more embodiments, the organic extractants selectively extract lithium impurities from the leached solution at higher temperatures, and precipitates out the lithium impurities at lower temperatures.

In one or more embodiments of one or more of the treatment processes for lithium impurities wherein the process comprises refining the pre-leached feedstock, the refining, impurities removal step of direct lithium extraction removes at least some, if not most of the lithium impurities from the feedstock that may have remained in the pre-leached feedstock following pre-treating, and have subsequently been extracted into the leached solution comprising the uncrystallized metal sulfate (i.e., the second portion of the lithium impurities). In one or more embodiments of the process, selectively removing at least the second portion of the lithium impurities removes that portion of the impurities from the leached solution that were originally from the feedstock, thus forming a cleaner/purer leached solution that can then be used in the production of materials for batteries, such as crystallized metal sulfates, that meet purity requirements. In one or more embodiments, selectively removing the second portion of the lithium impurities comprises selectively removing about 50% to about 99%, or about 60% to about 99%, or about 70% to about 99%, or about 80% to about 99% of the lithium impurities in the leached solution that were originally in the feedstock, and remained in the pre-leached feedstock.

In one or more embodiments of one or more of the treatment processes for lithium impurities wherein the process comprises refining the pre-leached feedstock, once the lithium impurities are selectively extracted by direct lithium extraction from the leached solution, they can then diverted downstream for further processing or for waste disposal. Following the removal of the lithium impurities, the leached solution comprising the uncrystallized metal sulfate can continue on for further processing. In one or more embodiments of the process, the direct lithium extraction occurs before the refining, component removal steps. In one or more embodiments of the process, the direct lithium extraction occurs following the refining, component removal steps.

In one or more embodiments of the treatment process, the process comprises leaching a feedstock comprising lithium impurities and forming a leached solution comprising an uncrystallized metal sulfate and the lithium impurities. In one or more embodiments of the process, leaching the feedstock comprises leaching under conditions to form the leached solution comprising an uncrystallized metal sulfate and the lithium impurities. In one or more embodiments, leaching the feedstock under conditions to form the leached solution comprises leaching under conditions to form a sulfate-matrix pregnant leached solution (PLS). There are a number of leaching conditions that may be suitable for forming the leached solution (or PLS). Based on the type or source of feedstock to be processed, a skilled person would recognize which leaching conditions to select and test, in order to confirm the selection and to define the specific conditions.

In one or more embodiments of the treatment processes wherein the process comprises leaching a feedstock comprising lithium impurities, the process further comprises refining the leached solution comprising an uncrystallized metal sulfate and the lithium impurities. In one or more embodiments of the process, refining the leached solution may comprise subjecting the leached solution comprising an uncrystallized metal sulfate and the lithium impurities (or PLS) to a series of component removal steps to form a refined leached solution. The type and amount of components to be removed is dependent, at least in part, on the type of feedstock from which the leached solution is formed. When producing materials for battery production, such as producing crystallized metal sulfates, there are specific product specifications (e.g., limits) for such components that are tolerated; and any such components that are present in the process' feedstock, water, or reagents in an amount that exceeds said product specification would need to have their concentration reduced. Examples of components to be removed include, but are not limited to, sodium (Na), aluminum (Al), iron (Fe), copper (Cu), zinc (Zn), cobalt (Co), nickel (Ni), or manganese (Mn). There are many suitable methods for removing components from the leached solution (or PLS). Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of components to be removed, as well as the specifications for the final product (e.g., crystallized metal sulfates) generated by the process. For example, the leached solution may be subjected to a series of component removal steps to remove components such as: Cu (e.g., via solvent extraction, cementation, ion exchange, etc.), Fe and Al (e.g., via precipitation, etc.), and Zn (e.g., via solvent extraction, ion exchange, etc.).

In one or more embodiments of one or more of the treatment processes wherein the process comprises refining the leached solution comprising an uncrystallized metal sulfate and the lithium impurities, refining the leached solution further comprises subjecting the leached solution comprising the uncrystallized metal sulfate and the lithium impurities to a refining, impurities removal step to remove at least a portion of the lithium impurities. In one or more embodiments, the refining, impurities removal step comprises selectively extracting a portion of the lithium impurities by direct lithium extraction.

In one or more embodiments of one or more of the treatment processes wherein the process comprises refining the leached solution comprising an uncrystallized metal sulfate and the lithium impurities, the direct lithium extraction (DLE) comprises selective extraction techniques in which lithium impurities are removed from the leached solution while leaving behind at least a majority of the materials desirable for the production of batteries, such as the metals cobalt, manganese, and/or nickel. In one or more embodiments, the direct lithium extraction comprises selectively extracting the lithium impurities using ion-exchange media, organic extractants, membranes, or a combination thereof. In one or more embodiments, the ion-exchange media comprises layered aluminate lithium sorbents. In one or more embodiments, the layered aluminate lithium sorbents selectively extract lithium impurities under pH neutral conditions or weakly acidic conditions. In one or more embodiments, the organic extractants selectively extract lithium impurities from the leached solution at higher temperatures, and release the lithium impurities at lower temperatures.

In one or more embodiments of one or more of the treatment processes wherein the process comprises refining the leached solution comprising an uncrystallized metal sulfate and the lithium impurities, the refining, impurities removal step of direct lithium extraction removes at least some, if not most of the lithium impurities in the leached solution comprising the uncrystallized metal sulfate and the lithium impurities. In one or more embodiments of the process, selectively removing at least a portion of the lithium impurities removes that portion of the impurities from the leached solution that were originally from the feedstock, thus forming a cleaner/purer leached solution that can then be used in the production of materials for batteries, such as crystallized metal sulfates, that meet purity requirements. In one or more embodiments, selectively removing the portion of the lithium impurities comprises selectively removing about 50% to about 99%, or about 60% to about 99%, or about 70% to about 99%, or about 80% to about 99% of the lithium impurities in the leached solution that were originally in the feedstock.

In one or more embodiments of one or more of the treatment processes wherein the process comprises refining the leached solution comprising an uncrystallized metal sulfate and the lithium impurities, once the lithium impurities are selectively extracted by direct lithium extraction from the leached solution, they can then diverted downstream for further processing or for waste disposal. Following the removal of the lithium impurities, the leached solution comprising the uncrystallized metal sulfate can continue on for further processing. In one or more embodiments of the process, the direct lithium extraction occurs before the refining, component removal steps. In one or more embodiments of the process, the direct lithium extraction occurs following the refining, component removal steps.

In one or more embodiments of one or more of the treatment processes for lithium impurities, the process further comprises crystallizing the uncrystallized metal sulfate from the leached solution to form a crystallized metal sulfate. In one or more embodiments, crystallizing the uncrystallized metal sulfate comprises introducing the leached solution comprising the uncrystallized metal sulfate into a crystallizer under conditions sufficient to selectively crystalize the uncrystallized metal sulfate. In one or more embodiments, selectively crystalizing the uncrystallized metal sulfate may comprise selectively crystallizing any one or combination of $NiSO_4$, $CoSO_4$, and/or $MnSO_4$, out of solution (e.g., via a forced circulation crystallizer under vacuum, etc., against manganese, etc. depending on the feed material) to produce crystallized metal sulfates in a mother liquor. These crystallized metal sulfates may then be discharged from the crystallizer, thus isolating them from the mother liquor. If one crystallization cycle (e.g., using one crystallizer) is insufficient to produce crystallized metal sulfates (which may occur with dirtier feed materials, for example), the crystals discharged from the crystallizer may be dissolved in pure water before introduction to a second crystallization cycle (e.g., using a second crystallizer) to be recrystallized.

Different types of crystallizers may be suitable for affecting the selective crystallization of the uncrystallized metal sulfate from the leached solution. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of metal sulfate to be crystallized, and/or the type and concentration of impurities in the leached solution. For example, bleeding the mother liquor from the crystallizer during crystallization, and the rates at which the bleeding occurs, can impact the purity of the crystallized metal sulfate; for example, by selectively inhibiting crystallization of impurities. Selecting a bleed rate to selectively inhibit crystallization of a specific impurity refers to setting a crystallizer bleed rate, within a range of possible bleed rates that inhibits the crystallization of the specific impurity more so than it would inhibit crystallization of a different impurity. The bleed rate may be selected such that it maximizes inhibiting crystallization of the specific impurity. The impurities may be sodium, potassium, etc. Using a higher bleed rate of the mother liquor helps to maintain lower concentrations of impurities and other components in the mother liquor that could impact the purity of the crystallized metal sulfates. Further, impurity solubility can be temperature dependent; therefore, selecting the crystallizer temperatures as well as the crystallizer bleed rates can be effective in managing the purity of the metal sulfate(s) being crystallized. Impurity solubility can also be dependent on the amount of free water present in the leached solution and/or mother liquor; therefore, managing water levels in the crystallizer can be an effective means of managing the purity of the metal sulfate (s) being crystallized. For example, in some instances, the metal sulfate crystallizes out of solution as metal-sulfate hydrates (i.e., crystallized metal sulfates and water molecules combined in a definite ratio as an integral part of the crystal), which reduces the concentration of water in the mother liquor. By decreasing the concentration of free water, the concentration of impurities (e.g. sodium, potassium, etc.) in the mother liquor may also increase to the point that they crystallize out of solution and impact the purity of the crystallized metal sulfates. However, if a sufficient amount of water is added to the leached solution and/or mother liquor when in the crystallizer, or if that amount of excess water remains in the leached solution after upstream treatment (e.g., at least as much water as is expected to be lost due to hydrate formation), the presence of that free water can inhibit the crystallization of impurities out of solution.

After crystallization, the mother liquor may still contain undesired salts/metals (e.g., $Li_2SO_4$, Mg, Na, etc.), as well as remaining, uncrystallized metal sulfate. To selectively recover the remaining, uncrystallized metal sulfates from the remaining undesired materials in solution, the mother liquor is 'bled' from the crystallizer, and basified to convert the uncrystallized metal sulfate to an insoluble, basic metal salt (e.g., metal hydroxides such as $Ni(OH)_2$, $Co(OH)_2$, $Mn(OH)_2$, etc.). The resultant basic metal salt (e.g., metal hydroxides) precipitate from the mother liquor, and may be isolated from the mother liquor via filtration. For example, the basic metal salt may be recovered by filtration, thickening and filtration, or centrifugation. The resultant precipitated metal hydroxides may also be washed or re-pulped to form a slurry, but are then used up-stream to neutralize acids introduced at the leaching and/or component removal stages of the process, thus converting the metal hydroxides back to uncrystallized metal sulfates that can then be isolated via crystallization downstream. Using the basic metal salt (e.g., metal hydroxides) as a neutralizing agent reduces and/or eliminates the need to introduce external neutralizing agents; this reduces reagent use (and associated costs), and reduces and/or eliminates additional sources of impurities that may impact product purity (e.g., cations $Na^+$, $K^+$, $Li^+$, $Ca^{2+}$, $Mg^{2+}$ from the external neutralizing agent), that would otherwise require the crystallizer bleed rate to be higher to avoid co-precipitation of the impurities and contamination of the crystallized metal sulfates. In some instances, to ensure that there is a sufficient amount of basic metal salts, e.g., metal hydroxides, available for use as a neutralizing agent, the rate at which the mother liquor is bled from the crystallizer and basified to form the metal hydroxides may be controlled such that the amount of metal hydroxides formed is at least approximately equivalent to, or approximately equivalent to the amount of acid introduced at the leaching and/or refining stages. Further, using the basic metal salts (e.g., metal hydroxides) as a neutralizing agent converts the basic metal salts back to metal sulfates within the leached solution. The leached solution, comprising the converted metal sulfates, then proceeds on to the crystallizer, wherein the converted metal sulfates may be crystallized and isolated from the mother liquor. This loop of isolating and basifying the mother liquor to convert uncrystallised metal sulfates in solution to basic metal salts, and using those basic metal salts as neutralizing agents to convert the basic metal salts back to metal sulfates that can then be isolated via crystallization, can improve the yield of isolated, crystallized metal sulfates obtained from a particular feedstock.

In one or more embodiments of one or more of the treatment processes for lithium impurities, crystallizing the uncrystallized metal sulfate comprises crystallizing the metal sulfate from the leached solution to form a crystallized metal sulfate in a mother liquor, the mother liquor comprising remaining uncrystallized metal sulfate; separating the crystallized metal sulfate from the mother liquor; basifying a portion of the mother liquor to convert the remaining uncrystallized metal sulfate to a basic metal salt; and using the basic metal salt upstream of crystallizing the metal sulfate. In one or more embodiments, using the basic metal salt upstream comprises converting the basic metal salt back to the uncrystallized metal sulfate. In one or more embodiments, converting the basic metal salt back to the uncrystallized metal sulfate comprises using the basic metal salt to neutralize acid upstream of crystallizing the metal sulfate. In one or more embodiments, the basic metal salt comprises a metal hydroxide. In one or more embodiments, the metal hydroxide comprises any one or a combination of nickel hydroxide, cobalt hydroxide, or manganese hydroxide.

Figure 6:
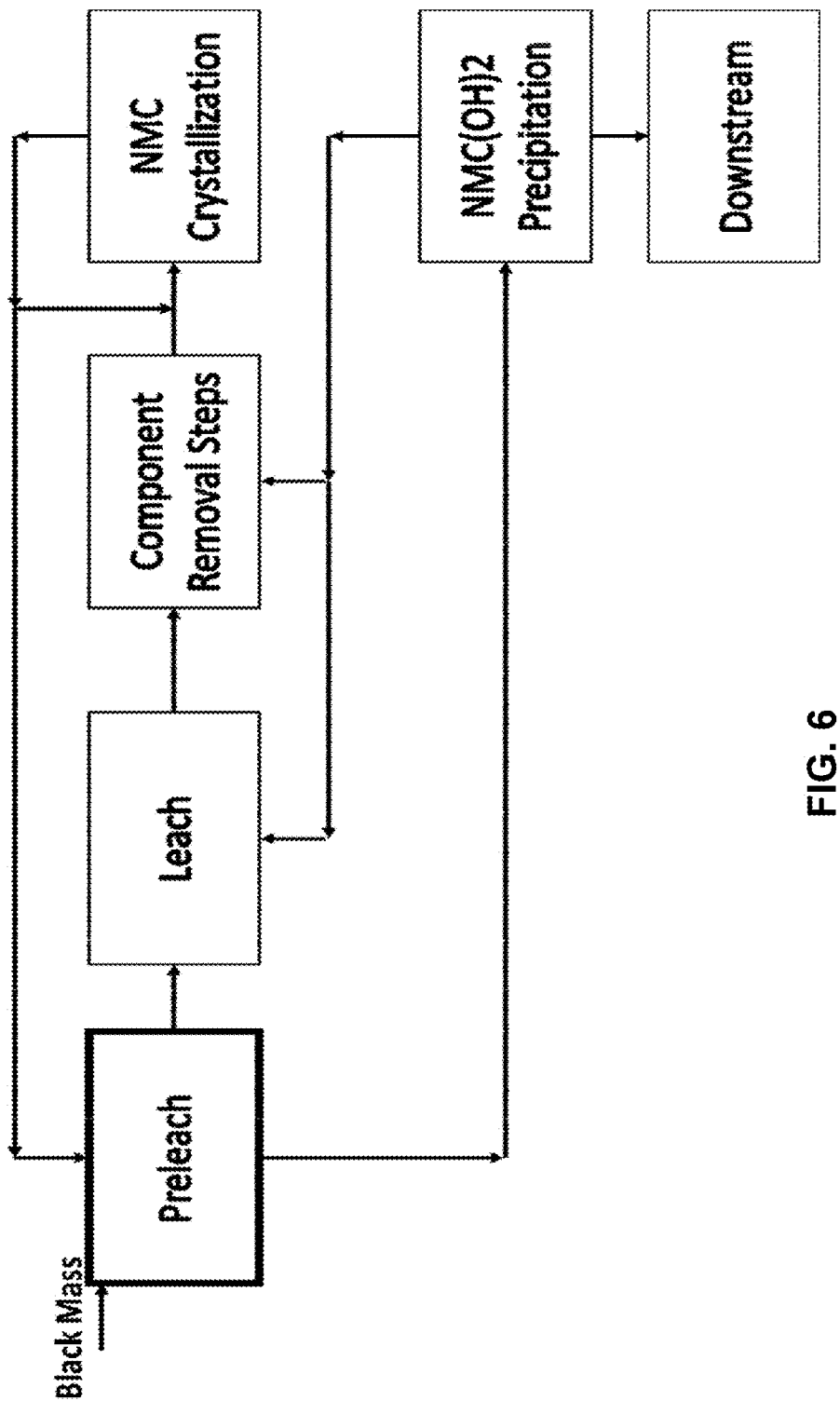
FIG. 6 depicts a treatment process for crystallizing a metal sulfate involving a black mass feedstock that comprises lithium impurities that highlights a pre-leaching step.

In one or more embodiments of one or more of the treatment processes wherein the process comprises pre-leaching the feedstock comprising lithium impurities, there is provided a treatment process as depicted in FIG. 6, wherein the feedstock is a black mass feedstock; the feedstock is pre-leached to remove a first portion of the lithium impurities and form a pre-leached feedstock and a solution comprising the lithium impurities; the solution comprising the impurities is basified to precipitate out nickel, manganese, and/or cobalt hydroxides (i.e., $NMC(OH)_2$) for use upstream in the process; the pre-leached feedstock is then leached and subjected to component removal steps to form a refined, leached solution comprising an uncrystallized metal sulfate; and the refined, leached solution is introduced into a crystallizer and nickel, manganese, and/or cobalt (NMC) sulfates are crystallized out.

Figure 7:
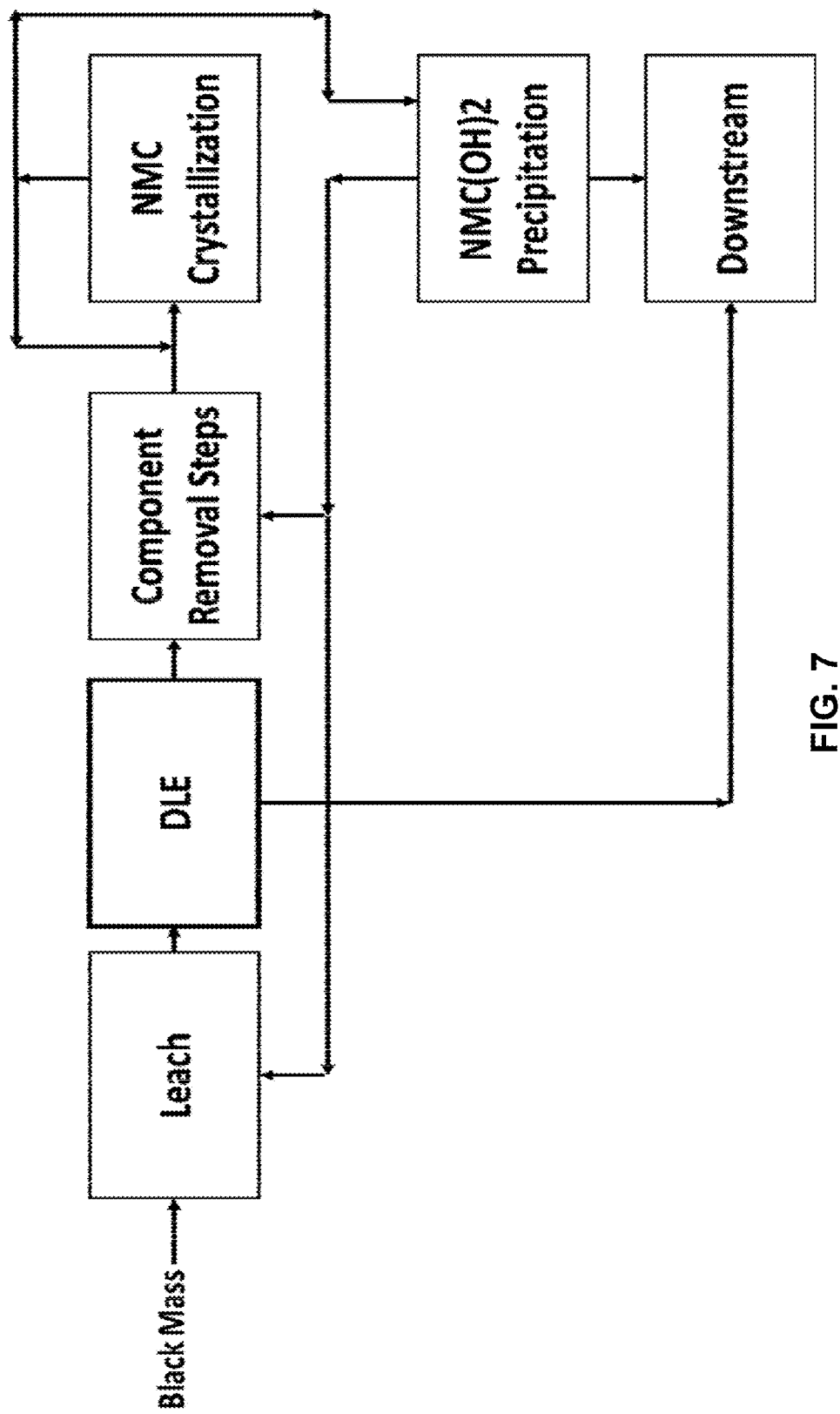
FIG. 7 depicts a treatment process for crystallizing a metal sulfate involving a black mass feedstock that comprises lithium impurities that highlights a direct lithium extraction step.

In one or more embodiments of one or more of the treatment processes wherein the process comprises refining the leached solution comprising an uncrystallized metal sulfate and the lithium impurities, there is provided a treatment process as depicted in FIG. 7, wherein the feedstock is a black mass feedstock; the feedstock is leached to form a leached solution comprising an uncrystallized metal sulfate and lithium impurities; the leached solution is then subjected to a refining, impurities removal step involving direct lithium extraction (DLE) to selectively extract a portion of the lithium impurities, following which the leached solution is subjected to component removal steps and the extracted lithium impurities are diverted downstream; and the refined, leached solution comprising an uncrystallized metal sulfate is introduced into a crystallizer and nickel, manganese, and/or cobalt (NMC) sulfates are crystallized out.

In one or more embodiments of one or more of the treatment processes for lithium impurities, the metal sulfate comprises any combination of the nickel sulfate, manganese sulfate, and/or cobalt sulfate. In one or more embodiments of the process, crystallizing the uncrystallized metal sulfate comprises selectively crystallizing any one or two of the nickel sulfate, manganese sulfate, and cobalt sulfate from the leached solution. In one or more embodiments of the process, crystallizing the uncrystallized metal sulfate comprises selectively crystallizing any combination of the nickel sulfate, manganese sulfate, and cobalt sulfate from the aqueous solution. In one or more embodiments of the process, the crystallized metal sulfate is a battery-grade crystallized metal sulfate, or an electroplating-grade crystallized metal sulfate.

In one or more embodiments of one or more of the treatment processes for lithium impurities, the pre-leaching process and/or direct lithium extraction reduces or eliminates lithium impurity levels in the leached solution comprising the uncrystallized metal sulfate, such that—when the leached solution is introduced into the crystallizer—there is an increase in the single-pass product yield, relative to when the pre-leaching process and/or direct lithium extraction does not occur. In one or more embodiments of any one of the treatment processes for lithium impurities, the pre-leaching process and/or direct lithium extraction reduces or eliminates lithium impurity levels in the leached solution comprising the uncrystallized metal sulfate, such that—when the leached solution is introduced into the crystallizer—the crystallizer bleed rates can be reduced, relative to when the pre-leaching process and/or direct lithium extraction does not occur. In one or more embodiments wherein there is an increase in the single-pass product yield, or a decrease in crystallizer bleed rates, there is a reduction in CAPEX and OPEX costs. In one or more embodiments of the process, the pre-leaching process and/or direct lithium extraction reduces or eliminates lithium impurity levels in the leached solution comprising the uncrystallized metal sulfate, such that the process provides crystallized metal sulfates that meet purity requirements for lithium impurities.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are indicative of the level of skill those skilled in the art to which this invention pertains and are herein incorporated by reference to the same extent as if each individual publication patent, or patent application was specifically and individually indicated to be incorporated by reference.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:
1. A treatment process for crystallizing a metal sulfate, the process comprising:
   pre-treating a feedstock comprising calcium and/or magnesium impurities the pre-treating comprising
   pre-leaching the feedstock in the presence of a lixiviant, selectively extracting a first portion of the calcium and/or magnesium impurities from the feedstock, and
forming a pre-leached feedstock;
refining the pre-leached feedstock and forming a leached solution comprising an uncrystallized metal sulfate;
crystallizing the uncrystallized metal sulfate from the leached solution to form a crystallized metal sulfate in a mother liquor, the mother liquor comprising a remaining uncrystallized metal sulfate;
separating the crystallized metal sulfate from the mother liquor;
basifying a portion of the mother liquor to convert the remaining uncrystallized metal sulfate to a basic metal salt; and
using the basic metal salt upstream of crystallizing the metal sulfate;
wherein crystallizing the uncrystallized metal sulfate further comprises bleeding the mother liquor and controlling the bleed rate to selectively inhibit crystallizing an impurity when crystallizing the uncrystallized metal sulfate.

2. The process of claim 1, wherein the first portion of the calcium and/or magnesium impurities from the feedstock comprises about 50% to about 99% of the calcium and/or magnesium impurities in the feedstock.

3. The process of claim 1, wherein the lixiviant is an acidic aqueous solution, a concentrated cobalt sulfate solution, or a combination thereof.

4. The process of claim 1, wherein the leached solution comprising an uncrystallized metal sulfate further comprises a second portion of the calcium and/or magnesium impurities from the feedstock, and the refining comprises
adding a fluoride source to the leached solution,
selectively reacting the fluoride source with the second portion of the calcium and/or magnesium impurities and forming calcium and/or magnesium fluoride compounds, and
precipitating the calcium and/or magnesium fluoride compounds from the leached solution.

5. The process of claim 4, further comprising removing residual fluoride source from the leached solution, the removing comprising
selectively reacting the residual fluoride source with a calcium source and forming calcium fluoride compounds, and
precipitating the calcium fluoride compounds from the leached solution.

6. The process of claim 5, wherein the calcium source is a calcium compound, and/or the calcium source is limestone, lime, gypsum, or a combination thereof; and/or
wherein the fluoride source is hydrogen fluoride, sodium fluoride, cobalt fluoride, ammonium fluoride, or a combination thereof.

7. The process of claim 5, further comprising removing residual calcium source by ion exchange, solvent extraction, or a combination thereof.

8. The process of claim 1, wherein the leached solution comprising an uncrystallized metal sulfate further comprises a second portion of the calcium and/or magnesium impurities from the feedstock, and the refining comprises
selectively solvent extracting the second portion of the calcium and/or magnesium impurities onto, or into a solvent extraction reagent, and
scrubbing the calcium and/or magnesium impurities from the solvent extraction reagent; and/or
removing the second portion of the calcium and/or magnesium impurities by ion exchange.

9. The process of claim 8, wherein the second portion of the calcium and/or magnesium impurities comprises about 50% to about 99% of the calcium and/or magnesium impurities in the leached solution.

10. The process of claim 1, wherein:
the metal sulfate comprises nickel sulfate, cobalt sulfate, or manganese sulfate;
the basic metal salt comprises a basic nickel salt, a basic cobalt salt, or a basic manganese salt; and/or
the impurity comprises lithium, sodium, potassium, or magnesium, or a combination thereof.

11. The process of claim 1, wherein:
using the basic metal salt upstream comprises using at least part of the basic metal salt upstream of crystallizing the metal sulfate in a refining stage to remove one or more impurities; and/or
crystallizing the uncrystallized metal sulfate further comprises bleeding the mother liquor and controlling the bleed rate and controlling an amount of free water in the crystallizer to selectively inhibit crystallizing the impurity when crystallizing the metal sulfate.

12. A treatment process for crystallizing a metal sulfate, the process comprising:
pre-treating a feedstock comprising lithium impurities, the pre-treating comprising pre-leaching the feedstock in the presence of a lixiviant,
selectively extracting a first portion of the lithium impurities from the feedstock, and
forming a pre-leached feedstock;
refining the pre-leached feedstock and forming a leached solution comprising an uncrystallized metal sulfate; and
crystallizing the uncrystallized metal sulfate from the leached solution to form a crystallized metal sulfate.

13. The process of claim 12, wherein crystallizing the uncrystallized metal sulfate from the leached solution to form a crystallized metal sulfate comprises:
crystallizing the uncrystallized metal sulfate from the leached solution to form a crystallized metal sulfate in a mother liquor, the mother liquor comprising remaining uncrystallized metal sulfate;
separating the crystallized metal sulfate from the mother liquor;
basifying a portion of the mother liquor to convert the remaining uncrystallized metal sulfate to a basic metal salt; and
using the basic metal salt upstream of crystallizing the metal sulfate.

14. The process of claim 13, wherein:
the metal sulfate comprises nickel sulfate, cobalt sulfate, or manganese sulfate; and/or
the basic metal salt comprises a basic nickel salt, a basic cobalt salt, or a basic manganese salt.

15. The process of claim 12, wherein the first portion of the lithium impurities comprises about 20% to about 70% of the lithium impurities in the feedstock.

16. The process of claim 12, wherein the lixiviant is water, an aqueous solution, an aqueous solution comprising an oxidant, an acidic aqueous solution, or an acidic aqueous solution comprising an oxidant.

17. The process of claim 16, wherein the oxidant comprises sodium persulfate, ozone, or sodium hypochlorite; and/or the acidic aqueous solution comprises sulfuric acid.

18. The process of claim 12, wherein the leached solution comprising an uncrystallized metal sulfate further comprises a second portion of the lithium impurities from the feedstock, and the refining comprises selectively extracting the second portion of the lithium impurities by direct lithium extraction.

19. The process of claim 18, wherein the second portion of the lithium impurities comprises about 50% to about 99% of the lithium impurities in the leached solution.

20. The process of claim 18, wherein direct lithium extraction comprises selectively extracting the lithium impurities using ion-exchange media, organic extractants, or membranes.

21. The process of claim 20, wherein the ion-exchange media comprises layered aluminate lithium sorbents.

22. A process for preparing a leached metal sulfate solution useful for production of battery materials, the process comprising:
pre-treating an intermediate feedstock comprised of a metal hydroxide and/or a mixed hydroxide precipitate (MHP), the intermediate feedstock comprising calcium and/or magnesium impurities,
the pre-treating comprising
pre-leaching the intermediate feedstock in the presence of a lixiviant,
selectively extracting a first portion of the calcium and/or magnesium impurities from the intermediate feedstock, and
forming a pre-leached feedstock;
refining the pre-leached feedstock; and
forming a leached solution comprising a metal sulfate, the leached solution comprising a remaining portion of the calcium and/or magnesium impurities at a concentration suitable for production of battery-grade materials.

23. The process of claim 22, wherein the refining comprises:
adding a fluoride source to the leached solution, selectively reacting the fluoride source with the remaining portion of the calcium and/or magnesium impurities and forming calcium and/or magnesium fluoride compounds, and precipitating the calcium and/or magnesium fluoride compounds from the leached solution;
selectively solvent extracting the remaining portion of the calcium and/or magnesium impurities onto, or into a solvent extraction reagent, and scrubbing the calcium and/or magnesium impurities from the solvent extraction reagent; and/or
removing the remaining portion of the calcium and/or magnesium impurities by ion exchange.

24. The process of claim 23, wherein the fluoride source is hydrogen fluoride, sodium fluoride, cobalt fluoride, ammonium fluoride, or a combination thereof.

25. The process of claim 23, further comprising removing residual fluoride source from the leached solution, the removing comprising
selectively reacting the residual fluoride source with a calcium source and forming calcium fluoride compounds, and
precipitating the calcium fluoride compounds from the leached solution.

26. The process of claim 25, wherein:
the calcium source is a calcium compound, and/or the calcium source is limestone, lime, gypsum, or a combination thereof; and/or
the process further comprises removing residual calcium source by ion exchange, solvent extraction, or a combination thereof.

27. The process of claim 23, wherein the second-remaining portion of the calcium and/or magnesium impurities comprises about 50% to about 99% of the calcium and/or magnesium impurities in the leached solution.

28. The process of claim 22, wherein the first portion of the calcium and/or magnesium impurities from the feedstock comprises about 50% to about 99% of the calcium and/or magnesium impurities in the feedstock.

29. The process of claim 22, wherein the lixiviant is an acidic aqueous solution, a concentrated cobalt sulfate solution, or a combination thereof.

30. The process of claim 22, wherein the intermediate feedstock is comprised of cobalt hydroxide and/or mixed hydroxide precipitates (MHP).

31. The process of claim 22, wherein the metal sulfate comprises nickel sulfate, cobalt sulfate, or manganese sulfate.

32. A process for preparing a leached metal sulfate solution useful for production of battery materials, the process comprising:
pre-treating a feedstock comprised of a battery feed, the feedstock comprising
lithium impurities, the pre-treating comprising
pre-leaching the feedstock in the presence of a lixiviant,
selectively extracting a first portion of the lithium impurities from the feedstock, and
forming a pre-leached feedstock;
refining the pre-leached feedstock; and
forming a leached solution comprising a metal sulfate, the leached solution comprising a remaining portion of lithium impurities at a concentration suitable for production of battery-grade materials.

33. The process of claim 32, wherein the refining comprises:
selectively extracting the remaining portion of the lithium impurities by direct lithium extraction.

34. The process of claim 33, wherein the remaining portion of the lithium impurities comprises about 50% to about 99% of the lithium impurities in the leached solution.

35. The process of claim 33, wherein direct lithium extraction comprises selectively extracting the lithium impurities using ion-exchange media, organic extractants, or membranes.

36. The process of claim 35, wherein the ion-exchange media comprises layered aluminate lithium sorbents.

37. The process of 32, wherein the first portion of the lithium impurities comprises about 20% to about 70% of the lithium impurities in the feedstock.

38. The process of claim 32, wherein the lixiviant is water, an aqueous solution, an aqueous solution comprising an oxidant, an acidic aqueous solution, or an acidic aqueous solution comprising an oxidant.

39. The process of claim 38, wherein:
the acidic aqueous solution comprises sulfuric acid; and/or
the oxidant comprises sodium persulfate, ozone, or sodium hypochlorite.

40. The process of claim 32, wherein the feedstock is comprised of a recycled battery feed, a black mass feed, or a combination thereof.

41. The process of claim 32, wherein the metal sulfate comprises nickel sulfate, cobalt sulfate, or manganese sulfate.

* * * * *